US007052434B2

(12) United States Patent
Makino et al.

(10) Patent No.: US 7,052,434 B2
(45) Date of Patent: May 30, 2006

(54) THROTTLE OPENING DEGREE CONTROL APPARATUS FOR INTERNAL COMBUSTION ENGINE

(75) Inventors: Hironobu Makino, Nagoya (JP); Koji Wada, Nagoya (JP); Kenichiro Sato, Rancho Palos Verdes, CA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/676,161

(22) Filed: Oct. 2, 2003

(65) Prior Publication Data

US 2004/0112335 A1 Jun. 17, 2004

(30) Foreign Application Priority Data

Oct. 3, 2002 (JP) ............................ 2002-291618

(51) Int. Cl.
*B60W 10/04* (2006.01)
*B60W 10/10* (2006.01)

(52) U.S. Cl. ...................................... 477/107; 477/905

(58) Field of Classification Search ................ 477/107, 477/110, 904, 905, 902; 701/54
See application file for complete search history.

(56) References Cited

U.S. PATENT DOCUMENTS 6,086,510 A * 7/2000 Kadota ....................... 477/107
6,370,470 B1 * 4/2002 Yamamura et al. ........... 701/96
6,524,222 B1 * 2/2003 Ootsuka ..................... 477/109
6,641,504 B1 * 11/2003 Genise et al. ............... 477/107
2003/0136377 A1 * 7/2003 Kowatari et al. ........... 123/399

FOREIGN PATENT DOCUMENTS

DE 373 8719 11/1987
DE 432 1333 1/1995
DE 197 12 843 3/1997
DE 198 38 454 8/1998
DE 101 47 314 9/2001
JP 07071291 A * 3/1995
JP 09-310637 12/1997

OTHER PUBLICATIONS

German Language Version of German Office Action 103 45 999.5-13, issued Sep. 19, 2005.
English Translation of German Office Action 103 45 999. 5-13, issued Sep. 19, 2005.

* cited by examiner

*Primary Examiner*—Tisha Lewis
(74) *Attorney, Agent, or Firm*—Kenyon & Kenyon LLP

(57) ABSTRACT

A vehicle engine is coupled to a driving system that includes a torque converter and an automatic transmission. An ECU sets a target value of an opening degree of a throttle valve based on a depression degree of an acceleration pedal. The ECU changes the throttle opening degree at a predetermined gradual change speed such that the throttle opening degree reaches the set target value. The ECU limits the gradual change speed of the throttle opening degree for a predetermined period such that a changing speed of the engine speed is suppressed at a reverse time when a direction of torque transmitted between the driving system and the engine is reversed. As a result, shock produced when the direction of torque between the driving system and the engine is switched is suppressed.

24 Claims, 13 Drawing Sheets

| Abating Coefficient Changing Point \ NT | 800 | 1200 | 2000 | |
|---|---|---|---|---|
| TA1 | 1° | 2° | 4.5° | ←M1 |
| TA2 | 2.5° | 4° | 7° | ←M2 |

Fig. 17 (a)

| Abating Coefficient Changing Point \ NT | 1500 | 1750 | 2000 |
|---|---|---|---|
| TA11 | 5° | 5° | 5° |
| TA12 | 10° | 10° | 10° |

Fig. 17 (b)

| Abating Coefficient Changing Point \ NT | 1000 | 1750 | 2000 |
|---|---|---|---|
| TA21 | 0.5° | 0.5° | 0.5° |
| TA22 | 2° | 4° | 6° |

Fig. 17 (c)

| Abating Coefficient Changing Point \ NT | 1000 | 1750 | 2000 |
|---|---|---|---|
| TA31 | 0.5° | 0.5° | 0.5° |
| TA32 | 1.5° | 2.5° | 4° |

| Gear | 1st | 2nd | 3rd | 4th | 5th |
|---|---|---|---|---|---|
| Time Limit (ms) | 300 | 400 | 500 | 600 | 700 |

THROTTLE OPENING DEGREE CONTROL APPARATUS FOR INTERNAL COMBUSTION ENGINE

BACKGROUND OF THE INVENTION

The present invention relates to a throttle opening degree control apparatus for an internal combustion engine, and more particularly to a throttle opening degree control apparatus for an internal combustion engine that has, for example, an electronically controlled throttle valve that is controlled with an actuator.

For example, Japanese Laid-Open Patent Publication No. 9-310637 discloses a typical throttle opening degree control apparatus for an internal combustion engine. When the depression degree of an acceleration pedal is equal to or less than a predetermined value, the apparatus of the publication determines an actuation speed based on computation results of target opening degree computation means for throttle opening degree, and drives an actuator such that the throttle valve is moved at the determined actuation speed. When the depression degree of the acceleration pedal surpasses the predetermined value, the control apparatus drives the actuator at a speed that is less than a predetermined upper limit speed, so that a shock due to acceleration is reduced. Therefore, until the throttle opening degree reaches a predetermined degree, the vehicle is smoothly accelerated according to the demand of the driver. After the throttle opening degree reaches the predetermined degree, the throttle valve is moved at a slower speed so that acceleration shock is reduced.

While a vehicle is running, the direction of torque transmitted between a vehicle driving system and an internal combustion engine is occasionally reversed. Such a reverse creates a torque shock in a transmission, which is a part of the vehicle driving system. The greater the difference between the speed of the engine and the speed of the vehicle driving system at the time of a reverse, the greater the torque shock caused by the reverse becomes. This degrades the drivability.

SUMMARY OF THE INVENTION

Accordingly, it is an objective of the present invention to provide a throttle opening degree control apparatus for an internal combustion engine, which apparatus minimizes a shock produced when the direction of torque transmitted between a vehicle driving system and an internal combustion engine is reversed, thereby improving the drivability.

To achieve the above objective, the present invention provides an apparatus for controlling a throttle opening degree, which is an opening degree of a throttle valve of an internal combustion engine mounted on a vehicle. The vehicle has a driving system coupled to an output shaft of the internal combustion engine. The apparatus includes a controller. The controller sets a target value of the throttle opening degree based on a depression degree of an acceleration pedal provided in the vehicle. The controller gradually changes the throttle opening degree at a predetermined gradual change speed such that the throttle opening degree reaches the target value. A rotation speed of the output shaft changes in accordance with changes in the throttle opening degree. The controller limits the gradual change speed of the throttle opening degree for a predetermined period such that a changing speed of the rotation speed of the output shaft is suppressed at a reverse time when a direction of torque transmitted between the driving system and the output shaft is reversed.

The present invention also provides a method for controlling a throttle opening degree, which is an opening degree of a throttle valve of an internal combustion engine mounted on a vehicle. The vehicle has a driving system coupled to an output shaft of the internal combustion engine. The method includes: setting a target value of the throttle opening degree based on a depression degree of an acceleration pedal provided in the vehicle; gradually changing the throttle opening degree at a predetermined gradual change speed such that that the throttle opening degree reaches the target value, wherein a rotation speed of the output shaft changes in accordance with changes in the throttle opening degree; and limiting the gradual change speed of the throttle opening degree for a predetermined period such that a changing speed of the rotation speed of the output shaft is suppressed at a reverse time when a direction of torque transmitted between the driving system and the output shaft is reversed.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 17(*a*) is a map showing abating coefficient changing points corresponding to a first gear according to an eighth embodiment;

FIG. 17(*b*) is a map showing abating coefficient changing points corresponding to a second gear according to the eighth embodiment;

FIG. 17(*c*) is a map showing abating coefficient changing points corresponding to a third gear according to the eighth embodiment;

DETAILED DESCRIPTION OF THE PREFERRED EMBODIMENTS

A throttle valve control apparatus for an internal combustion engine according to a first embodiment of the present invention will now be described with reference to the drawings. The control apparatus is used for a gasoline engine 11 in this embodiment.

Figure 1:
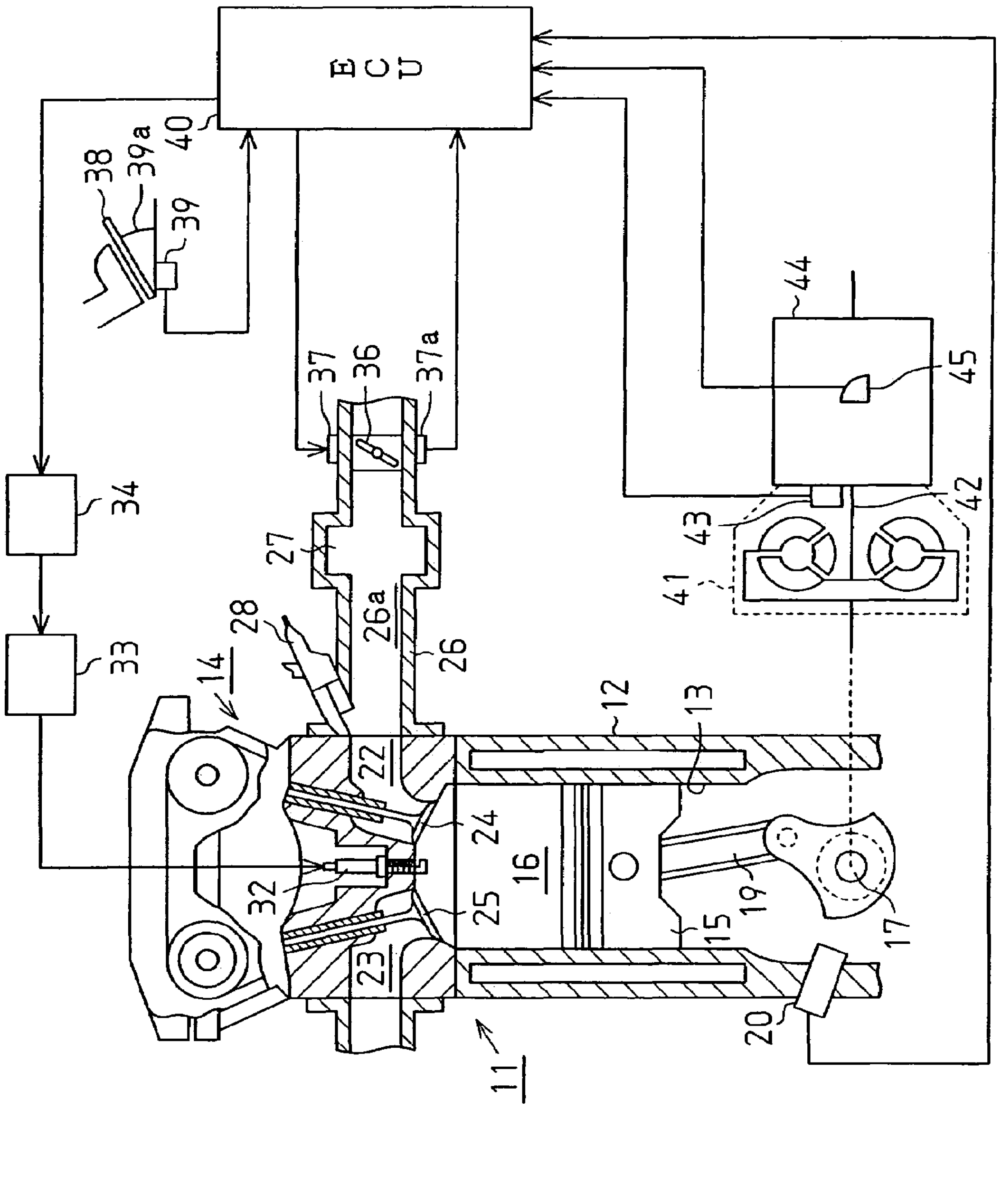
FIG. 1 is a diagrammatic view illustrating a throttle valve control apparatus for an engine according to a first embodiment of the present invention.

As shown in FIG. 1, the engine 11 has a cylinder block 12, in which cylinders 13 are formed. Each cylinder 13 accommodates a piston 15. The piston 15 reciprocates in the cylinder 13. A cylinder head 14 is placed on the top of the cylinder block 12. Each cylinder 13, the cylinder head 14, and the top surface of the associated piston 15 define a combustion chamber 16. The engine 11 includes an output shaft, which is a crankshaft 17, and connecting rods 19. Each connecting rod 19 corresponds to one of the pistons 15 and converts reciprocation of the piston 15 to rotation of the crankshaft 17.

An engine speed sensor 20 is provided in an outer wall of one of the cylinders 13. The engine speed sensor 20 is located in the vicinity of the crankshaft 17 and detects the speed NE of the crankshaft 17. The speed NE will hereinafter be referred to as engine speed.

Pairs of intake ports 22 and exhaust ports 23 are formed in the cylinder head 14. Each pair of the intake and exhaust ports 22, 23 corresponds to one of the combustion chamber 16. An intake valve 24 and an exhaust valve 25 are provided at each intake port 22 and each exhaust port 23, respectively. An intake manifold 26 is connected to the intake ports 22. The interior of the intake manifold 26 functions as an intake passage 26*a*. The intake manifold 26 has a surge tank 27. An injector 28 is provided at the joint between each intake port 22 and the intake manifold 26. Each injector 28 supplies fuel to the corresponding intake port 22. Fuel of a predetermined pressure is supplied to the injectors 28 from a fuel tank (not shown) by a fuel pump (not shown).

An electronically controlled throttle valve 36 is provided in the intake manifold 26. The throttle valve 36 is located upstream of the surge tank 27 and adjusts the amount of intake air supplied to the combustion chambers 16. The throttle valve 36 is actuated by a throttle valve motor 37. The motor 37 is electrically controlled with output signals from an electronic control unit (ECU) 40. The opening degree of the throttle valve 36 is monitored by a throttle sensor 37*a*. Monitoring results are sent to the ECU 40.

An ignition plug 32 is provided for each cylinder 13 of the engine 11. Each ignition plug 32 is electrically connected to an ignition coil 33 and an igniter 34. Based on ignition signals from the ECU 40, each igniter 34 supplies or stops current to a primary coil of the corresponding ignition coil 33. Each ignition coil 33 causes the corresponding ignition plug 32 to discharge spark using a high voltage induced at a secondary coil when a primary current is stopped. That is, each ignition plug 32 performs ignition in response to an ignition signal sent from the ECU 40 to the corresponding igniter 34.

Outside air collected by an air cleaner is sent to the engine 11 through the intake manifold 26, which includes the surge tank 27. Fuel is injected from each injector 28. Accordingly, mixture of outside air and fuel is sent to the corresponding combustion chamber 16 in synchronization with opening of the corresponding intake valve 24 in an intake stroke of the corresponding piston 15. The mixture in each combustion chamber 16 is ignited by the corresponding ignition plug 32. The combustion of the mixture generates power of the engine 11. After combustion, exhaust gas is guided to exhaust pipe in synchronization of opening of the corresponding exhaust valve 25 and discharged to the exterior through the exhaust pipe.

An acceleration pedal switch 39 and a depression degree sensor 39*a* are provided at an acceleration pedal 38. The pedal switch 39 is turned on when the acceleration pedal 38 is depressed. The depression degree sensor 39*a* detects a depression degree ACCP of the acceleration pedal 38.

The engine 11 is coupled to a vehicle driving system that includes a torque converter 41 and an automatic transmission 44. The vehicle driving system transmits driving force of the engine 11 to wheels. Also, when the vehicle is decelerating, the vehicle driving system transmits force from the wheels to the engine 11. The torque converter 41 is a clutch mechanism (coupling mechanism) that permits an output shaft 42 of the torque converter 41 and the crankshaft 17 of the engine 11 to rotate relative to each other. The output shaft 42 functions as an input shaft in the vehicle driving system. The torque converter 41 has a converter speed sensor 43, which detects a speed NT of an output shaft 42 of the torque converter 41. The speed NT will be referred to as converter speed. The automatic transmission 44 has a gear sensor 45 for detecting the currently selected gear.

The ECU 40 is a controller configured as a logic circuit that includes a central processing unit (CPU) that performs processes for various controls, a ROM storing predetermined programs, a RAM for temporarily storing computation results of the CPU, a backup RAM. The CPU, the ROM, the RAM, and the backup RAM are connected to an external input circuit and an external output circuit with a bus.

The ECU 40 receives detected values from sensors such as the engine speed sensor 20, the acceleration pedal switch 39, the depression degree sensor 39*a*, the throttle sensor 37*a*, the converter speed sensor 43, and the gear sensor 45. In addition to the throttle valve motor 37, the injectors 28 and the igniters 34 are electrically connected to the ECU 40. The ECU 40 receives output signals from the sensors 20, 39*a*, 37*a* and the acceleration pedal switch 39 through the external input circuit. Based on received input values, the ECU 40 controls the injectors 28, the igniters 34, and the throttle valve motor 37. In accordance with the control of the throttle valve motor 37, the opening degree of the throttle valve 36 is adjusted. Accordingly, the amount of air supplied to the engine 11 is changed with delay after the opening degree of the throttle valve 36 is changed, and the speed of the engine 11 is favorably controlled in accordance with a demand for driving.

Figure 6:
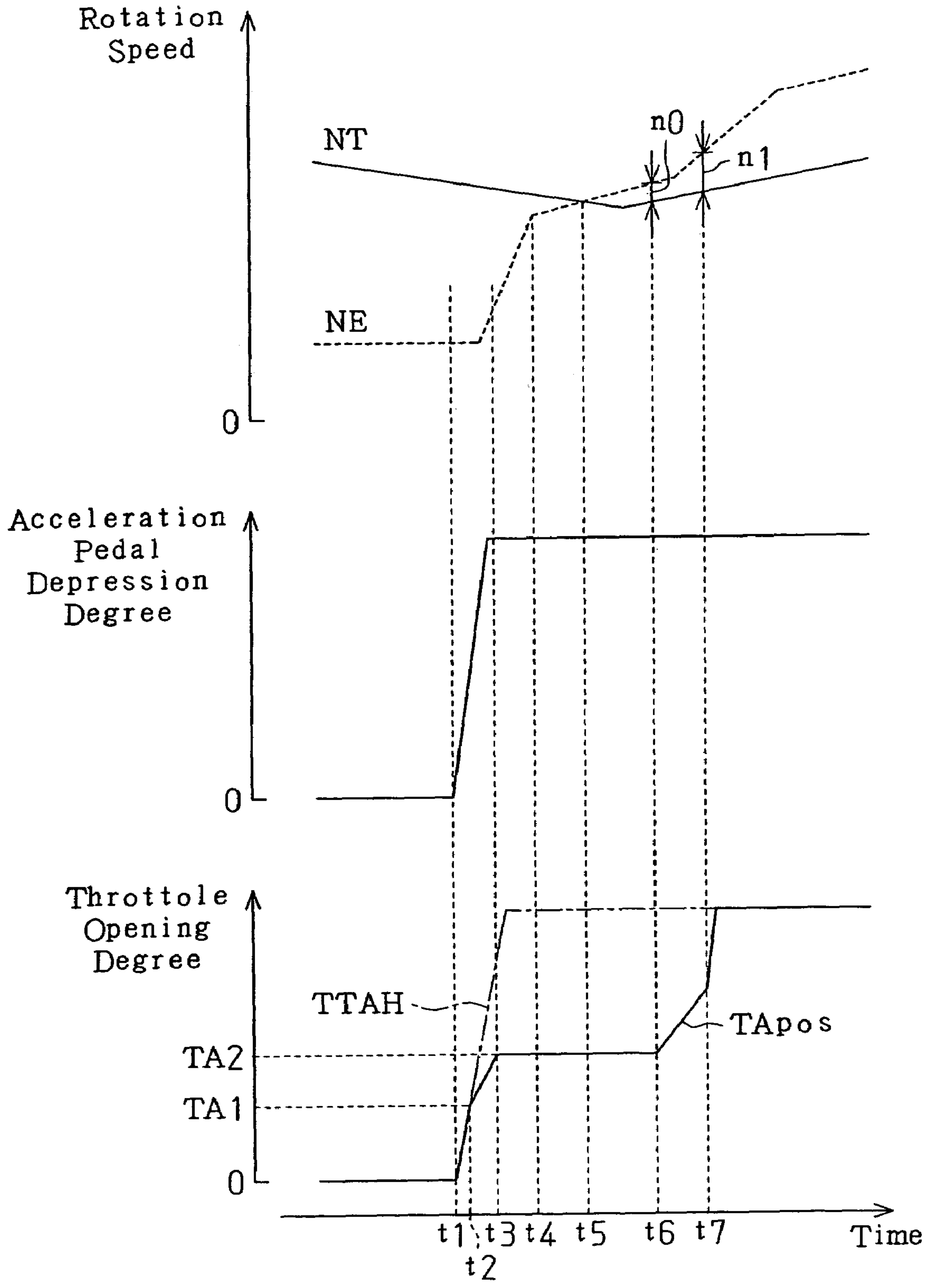
FIG. 6 is a timing chart showing an operation of the first embodiment.

In this embodiment, the ECU 40 controls the opening degree of the throttle valve 36 according to the acceleration pedal depression degree ACCP. When the throttle valve 36 is controlled, the throttle opening degree is controlled at a predetermined gradual change speed relative to the pedal depression degree ACCP. For example, when the engine speed NE is changed such that the relationship between the engine speed NE and the converter speed NT is switched as shown in FIG. 6, the direction of torque transmitted through the automatic transmission 44 is switched and a torque shock is produced. Therefore, when the relationship between the engine speed NE and the converter speed NT is switched, the opening degree of the throttle valve 36 is controlled such that the changing speed of the engine speed NE is decreased. The ECU 40 recognizes a reverse of the direction of transmitted torque based on switching in the orders of the engine speed NE and the converter speed NT.

In this embodiment, during acceleration in which the engine speed NE is changed from a value less than the converter speed NT to a value greater than the converter speed NT as shown in FIG. 6, the opening degree of the throttle valve 36 is controlled such that the engine speed NE is first smoothly increased to a value close to the converter speed NT. In a period from time immediately before the engine speed NE surpasses the converter speed NT to time immediately after the engine speed NE surpasses the converter speed NT, the opening of the throttle valve 36 is controlled such that the engine speed NE increases at a gradual speed. After the engine speed NE surpasses the converter speed NT, the opening of the throttle valve 36 is controlled such that the engine speed NE quickly increases to a level corresponding to the pedal depression degree.

As described above, the intake air amount is changed with a delay after a change of the opening degree of the throttle valve 36. The change of the intake air amount causes the engine speed NE to change. That is, the engine speed NE is changed with a delay after a change in the opening degree of the throttle valve 36.

To change the engine speed NE at a gradual speed when the converter speed NT is a given value, only two values of the engine speed NE, or a first engine speed NE and a second engine speed NE, need to be set. The first engine speed NE is less than the converter speed NT by a first predetermined value $\alpha$, and the second engine speed NE is higher than the converter speed NT by a second predetermined value $\beta$. The engine speed NE substantially corresponds to the throttle opening degree. Thus, a first throttle opening degree TA1 is set to correspond to the first engine speed NE (NT$-\alpha$), which is less than the converter speed NT by the first predetermined value $\alpha$, and a second throttle opening degree TA2 is set to correspond to the second engine speed NE (NT$+\beta$), which is higher than the converter speed NT by the second predetermined value $\beta$. The first engine speed and the second engine speed are determined by postulating the normal running state of the engine. The first throttle opening degree TA1 and the second throttle opening degree TA2 are determined in consideration of a delay of change in the engine speed NE in response to a change in the throttle opening degree. By gradually changing the throttle opening from the first throttle opening degree TA1 to the second throttle opening degree TA2, the engine speed NE is increased at a gradual speed in a period in which the engine speed NE changes from a value that is less than the converter speed NT by the predetermined value $\alpha$ to a value that is greater than the predetermined value $\beta$.

In the abating control of the throttle opening degree, the ECU 40 computes a provisional target opening degree TTAH based on the engine speed NE and the acceleration pedal depression degree ACCP. The ECU 40 then performs abating of the provisional target opening degree TTAH using a predetermined abating coefficient NSM, thereby setting a target opening degree TAMOD. The target opening degree TAMOD is used for controlling the opening degree of the throttle valve 36. When the actual opening degree of the throttle valve 36 reaches the first and second throttle opening degrees TA1 and TA2, which are determined with reference to the converter speed NT, the abating coefficient NSM is changed.

Throttle valve opening control performed by the throttle valve control apparatus of the above described engine 11 will now be described.

Figure 2:
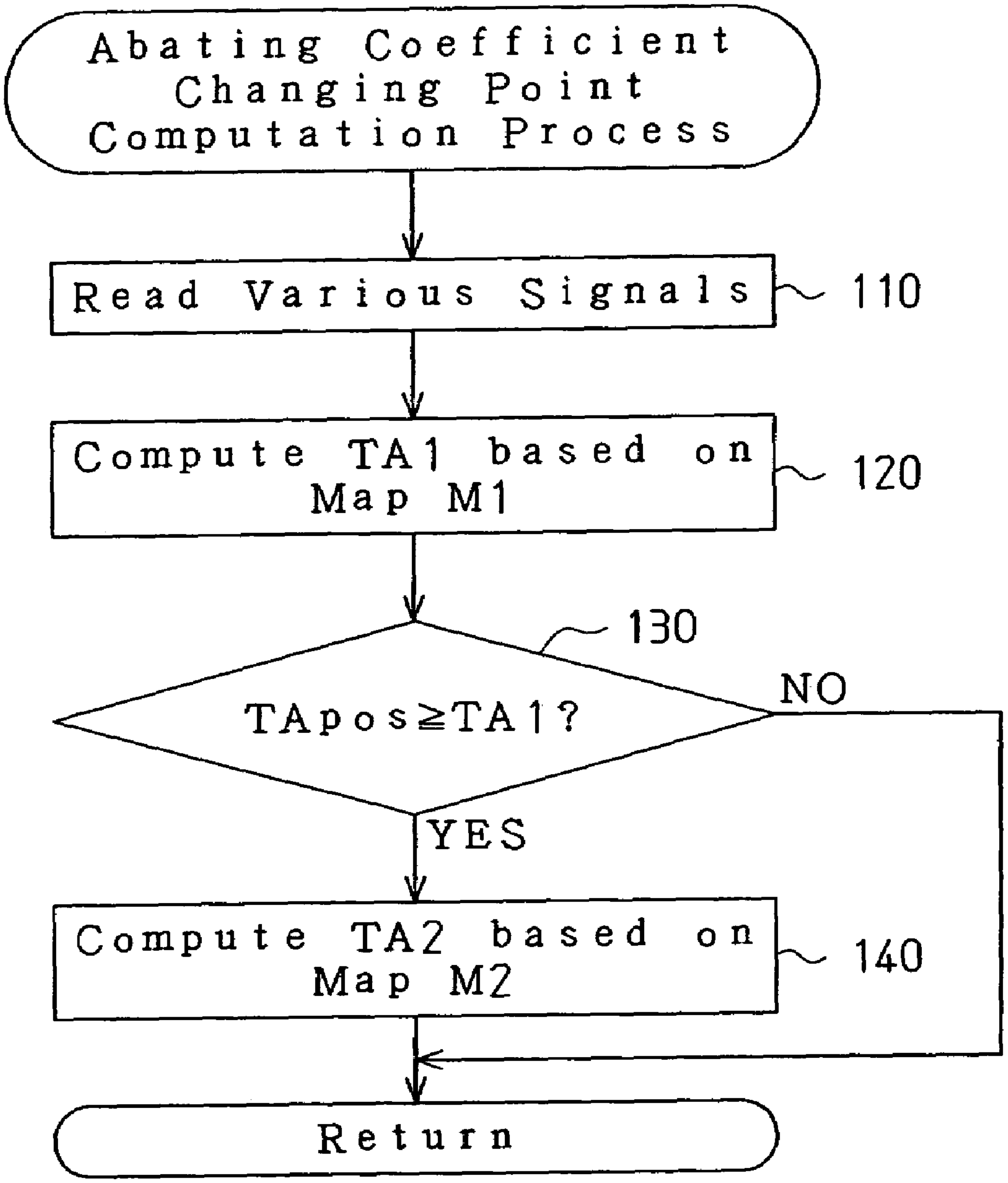
FIG. 2 is a flowchart showing a process for computing abating coefficient changing points executed by an ECU.
Figure 3:
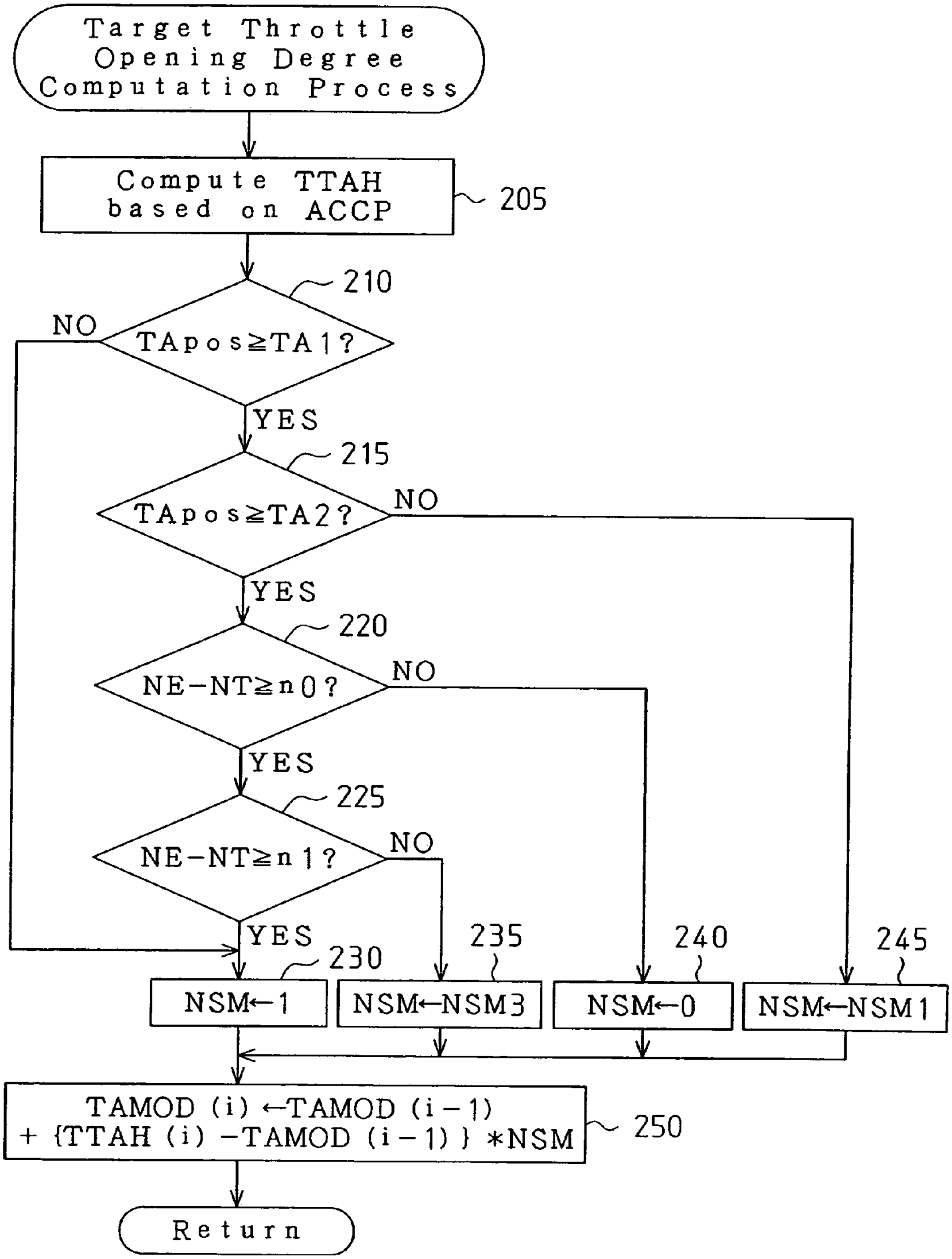
FIG. 3 is a flowchart showing a process for computing a target throttle opening degree executed by the ECU.

FIG. 2 is a flowchart of process for computing an abating coefficient changing point executed by the ECU 40 during a control of the opening degree of the throttle valve 36. FIG. 3 is a flowchart showing a process for computing a target throttle opening degree of the throttle valve 36 executed by the ECU 40.

The routine of FIG. 2 is performed in an interrupting manner at a predetermined time (for example, 8 ms). When the process of FIG. 2 is started, the ECU 40 reads a throttle opening degree TApos, the engine speed NE, and the converter speed NT based on signals from the throttle sensor 37*a*, the engine speed sensor 20, and the converter speed sensor 43 in step 110. The ECU 40 also receives data regarding the currently selected gear and the acceleration pedal depression degree ACCP based on signals from the gear sensor 45 and the pedal depression degree sensor 39*a*.

In step 120, based on the converter speed NT, the ECU 40 computes the first throttle opening degree TA1 referring to an abating coefficient changing point map M1. The first throttle opening degree TA1 represents a timing at which the abating coefficient of the abating coefficient NSM. For example, when the converter speed NT is less than 800 rpm, 1° is adopted as the first throttle opening degree TA1, and when the converter speed NT is greater than 2000 rpm, 4.520 is adopted as the first throttle opening degree TA1. When the converter speed NT is in a range between 800 rpm and 1200 rpm, the first throttle opening degree TA1 is computed by performing interpolation based on the converter speed NT and the map M1. For example, if the converter speed NT is 1000 rpm, the first throttle opening degree TA1 is 1.5°.

In step 130, the ECU 40 determines whether the current throttle opening degree TApos is equal to or more than the first throttle opening degree TA1. If the current throttle opening degree TApos is less than the first throttle opening degree TA1, the ECU 40 temporarily suspends the current process. If the current throttle opening degree TApos is equal to or more than the first throttle opening degree TA1, the ECU 40 proceeds to step 140.

In step 140, the ECU 40 computes the second throttle opening degree TA2 based on an abating coefficient changing point map M2. The second throttle opening degree TA2 represents a timing at which the abating coefficient NSM is changed. For example, when the converter speed NT is less than 800 rpm, 2.5° is adopted as the second throttle opening degree TA2, and when the converter speed NT is greater than 2000 rpm, 7° is adopted as the second throttle opening degree TA2. When the converter speed NT is in a range between 800 rpm and 1200 rpm, the second throttle opening degree TA2 is computed by performing interpolation based on the converter speed NT and the map M2. For example, if the converter speed NT is 1000 rpm, the second throttle opening degree TA2 is 3.75°. The ECU 40 then temporarily suspends the current process.

A process for computing a target throttle opening degree executed by the ECU 40 will now be described with reference to FIG. 3. The routine of FIG. 3 is performed in an interrupting manner at a predetermined time (for example, 8 ms).

When the process of FIG. 3 is started, the ECU 40 computes the provisional target opening degree TTAH based on the acceleration pedal depression degree ACCP obtained in step 110 (see an alternate long and short dashed line in FIG. 6). When computing the provisional target opening degree TTAH, the ECU 40 refers to a map (not shown).

In step 210, the ECU 40 determines whether the current throttle opening degree TApos is equal to or more than the first throttle opening degree TA1. If the throttle opening degree TApos is less than the first throttle opening degree TA1, the ECU 40 proceeds to step 230. In step 230, the ECU 40 sets the abating coefficient NSM, which is used in an abating control, to one. The abating control will be described below.

If the throttle opening degree TApos is equal to or more than the first throttle opening degree TA1 in step 210, the ECU 40 proceeds to step 215.

In step 215, the ECU 40 determines whether the throttle opening degree TApos is equal to or more than the second throttle opening degree TA2. If the throttle opening degree TApos is less than the second throttle opening degree TA2, the ECU 40 proceeds to step 245. In step 245, the ECU 40 sets the abating coefficient NSM to a value NSM1. The inequality 0<NSM1<1 is satisfied.

If the throttle opening degree TApos is equal to or more than the second throttle opening degree TA2 in step 215, the ECU 40 proceeds to step 220.

In step 220, the ECU 40 determines whether the difference between the engine speed NE and the converter speed NT, or a value (NE−NT)., is equal to or more than a predetermined value n0. In other words, whether the engine speed NE surpasses the converter speed NT by an amount that is equal to or more than the predetermined value n0. If the speed difference (NE−NT) is less than the predetermined value n0, the ECU 40 proceeds to step 240. In step 240, the ECU 40 sets the abating coefficient NSM to zero.

If the speed difference (NE−NT) is equal to or more than the predetermined value n0 in step 220, the ECU 40 proceeds to step 225.

In step 225, the ECU 40 determines whether the difference (NE−NT) between the engine speed NE and the converter speed NT is equal to or more than a predetermined value n1 (n1>n0 ). In other words, whether the engine speed NE surpasses the converter speed NT by an amount that is equal to or more than the predetermined value n1. If the speed difference (NE−NT) is less than the predetermined value n1, the ECU 40 proceeds to step 235. In step 235, the ECU 40 sets the abating coefficient NSM to a value NSM3. The inequality 0<NSM1<3is satisfied.

If the speed difference (NE−NT) is equal to or more than the predetermined value n1 in step 225, the ECU 40 proceeds to step 230. In step 230, the ECU 40 sets the abating coefficient NSM to one.

The ECU 40 proceeds to step 250 from one of steps 245, 240, 235, and 230. In step 250, the ECU 40 performs the abating of the provisional target opening degree TTAH using the abating coefficient NSM based on the following equation (1), thereby computing a target opening degree TAMOD(i). Thereafter, the ECU 40 terminates the current process.

$$TAMOD(i) \leftarrow TAMOD(i-1)+(TTAH(i)-TAMOD(i-1))\times NSM \quad (1)$$

In the equation (1), TAMOD(i) represents a target opening degree that is computed in the current routine, and TAMOD (i−1) represents a target opening degree that has been computed in the preceding routine. TTAH(i) represents the current provisional target opening degree TTAH. NSM represents the abating coefficient set in step 245, 240, 235, or 230 in the current routine.

The throttle valve motor 37 is driven based on the computed target opening degree TAMOD(i), and the opening degree of the throttle valve 36 is controlled.

An operation of this embodiment will be described with reference to FIG. 6.

Suppose that the vehicle is decelerating, the acceleration pedal 38 is not depressed, and the throttle opening degree TApos is 0°. At this time, torque from the wheels is transmitted to the engine 11 through the output shaft 42 of the torque converter 42. The torque converter speed NT is gradually decreased from a great value, and the engine speed NE is a speed that is slightly more than a predetermined idling speed.

Figures 4, 5:
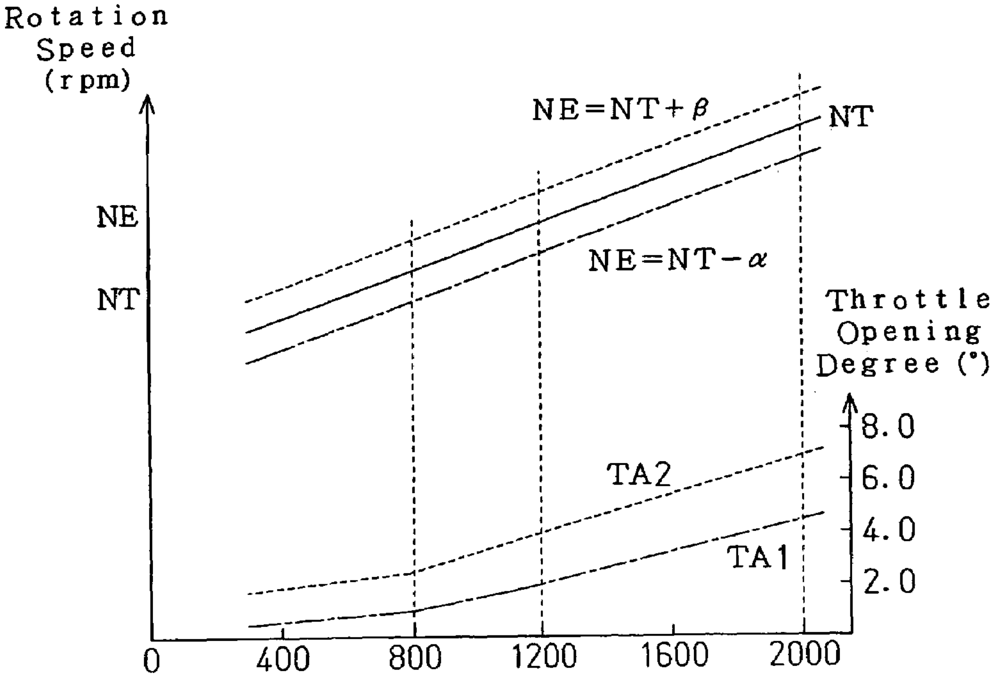
FIG. 4 is a map showing abating coefficient changing points corresponding to the speed of the output shaft of a torque converter.
FIG. 5 is a graph showing the relationship between the speed of the output shaft of the torque converter and the throttle opening degree.

When the acceleration pedal 38 is depressed at time t1 of FIG. 6, the first throttle opening degree TA1 that corresponds to the current converter speed NT is computed referring to the abating coefficient changing point map M1 shown in FIG. 4 (step 120 in FIG. 2). For example, if the current converter speed NT is 800 rpm, the first throttle opening degree TA1 is 1°. In this case, since the actual throttle opening degree TApos is still less than the first throttle opening degree TA1 (negative outcome in step 210 of FIG. 3), the abating coefficient NSM is set to one (step 230 of FIG. 3). Therefore, in step 250 of FIG. 3, the provisional target opening degree TTAH computed in step 205 of FIG. 3 is used as the target opening degree TAMOD. Thus, from time t1 at which the acceleration pedal 38 is depressed to time t2 at which the actual throttle opening degree TApos reaches the first throttle opening degree TA1, the provisional target opening degree TTAH and the throttle opening degree TApos are increased as time elapses. Accordingly, the throttle valve motor 37 and the throttle valve 36 are actuated relatively quickly based on the provisional target opening degree TTAH. The intake air amount is increased with a delay after the change of the throttle opening degree TApos, and the engine speed NE is increased.

When the throttle opening degree TApos reaches the first throttle opening degree TA1 at time t2, the second throttle opening degree TA2 that corresponds to the current converter speed NT is computed referring to the abating coefficient changing point map M2 shown in FIG. 4 (step 140 of FIG. 2). For example, if the converter speed NT at the time is equal to or less than 800 rpm, the second throttle opening degree TA2 is 2.5°.

At this time, since the throttle opening degree TApos is less than the second throttle opening degree TA2 and equal to or more than the first throttle opening degree TA1, the abating coefficient NSM is set to NSM1 (step 245 of FIG. 3). Therefore, in a period from time t2, at which the actual throttle opening degree TApos reaches and surpasses the first throttle opening degree TA1, to time t3, at which the actual throttle opening degree TApos reaches the second throttle opening degree tA2, the target opening degree TAMOD is gradually increased compared to an increase of the provisional target opening degree TTAH. Thus, the throttle valve motor 37 and the throttle valve 36 are gradually actuated to the second throttle opening degree TA2.

The intake air amount is increased with a delay after the change of the throttle opening degree TApos, and the engine speed NE is increased. Therefore, the engine speed NE reaches a first speed (NT−α) at time t4 that is after time t2, at which the throttle opening degree TApos reaches the first throttle opening degree TA1. The first speed (NT−α) is less than a speed that corresponds to the intake air amount associated with the first throttle opening degree TA1, or the converter speed NT, by the first predetermined amount α.

If the throttle opening degree TApos reaches the second throttle opening degree TA2 at time t3, which is later than time t2, (positive outcome in step 215 of FIG. 3), and the speed difference (NE−NT) between the engine speed NE and the converter speed NT at the time is less than the predetermined value n0 (negative outcome in step 220 in FIG. 3), the abating coefficient NSM is set to zero (step 240 of FIG. 3). Therefore, the target opening degree TAMOD does not change regardless whether the provisional target opening degree TTAH has changed, and the throttle opening degree TApos is maintained at the second throttle opening degree TA2. While the throttle opening degree TApos is maintained at the second throttle opening degree TA2, the intake air amount is not changed due to changes in the throttle opening degree.

The intake air amount is increased with a delay after the change of the throttle opening degree TApos, and the engine speed NE increases. Therefore, the engine speed NE reaches a second speed (NT+β) at time t6 that is after time t3, at which the throttle opening degree TApos reaches the second throttle opening degree TA2. The second speed (NT+β) is greater than a speed that corresponds to the intake air amount associated with the second throttle opening degree TA2, or the converter speed NT, by the second predetermined amount β. That is, in a period after time t3, in which period the throttle opening degree TApos is maintained at the second throttle opening degree TA2, specifically, in a period from time t4 to time t6, the engine speed NE is gradually increased from the first speed (NT−α) to the second speed (NT+β). At time t5, which is between time t4 and time t6, the order of the values of the engine speed NE and the converter speed NT is switched. Then, torque of the engine 11 is transmitted to the automatic transmission 44 through the output shaft 42 of the torque converter 41.

When the speed difference (NE−NT) between the current engine speed NE and the current converter speed NT reaches and surpasses the predetermined value n0 at time t6, the abating coefficient NSM is set to NSM3 (step 235 of FIG. 3). That is, it is determined that the engine speed NE is higher than the converter speed NT by a value equal to or greater than the predetermined value n0 , and that vehicle is in a sufficient acceleration. Then, the control for maintaining the throttle opening degree TApos at the second throttle opening degree tA2 is terminated.

When the speed difference (NE−NT) between the engine speed NE at the time and the converter speed NT at the time reaches the predetermined value n1 (n1>n0 ) at time t7 subsequent to time t6, the engine speed NE is sufficiently greater than the converter speed NT. The abating coefficient NSM is therefore set to one (step 230 of FIG. 3). Accordingly, the provisional target opening degree TTAH at the time is set as the target opening degree TAMOD without being changed, and the throttle opening degree TApos is quickly increased. That is, the throttle valve motor 37 and the throttle valve 36 are relatively quickly moved to the provisional target opening degree TTAH, which corresponds to the depression degree of the acceleration pedal 38.

This embodiment has the following advantages.

Therefore, during a period in which the order of the values of the engine speed NE and the converter speed NT is switched, the ECU 40 adjusts the gradual change speed of the throttle opening degree such that the changing speed of the engine speed NE is decreased. Torque shock produced when the direction of torque through the automatic transmission 44 is reversed is thus reduced, which improves the drivability.

For a given value of the converter speed NT, the ECU 40 sets the first engine speed NE, which is lower than the converter speed NT by the first predetermined value α, and the second engine speed NE, which is higher than the converter speed NT by the second predetermined value β. Then, for these engine speeds, the ECU 40 sets the first throttle opening degree tA1 and the second throttle opening degree TA2. When the throttle opening degree TApos reaches either the first throttle opening degree TA1 or the second throttle opening degree TA2, the ECU 40 changes the abating coefficient. Accordingly, the engine speed NE is quickly increases to the first speed, which corresponds to the first throttle opening degree TA1, and then is gradually increased to the second speed, which corresponds to the second throttle opening degree TA2, from the first speed. Therefore, the speed of change of the engine speed NE when the order of the values of the engine speed NE and the converter speed NT is reversed is decreased, and torque shock produced when the direction of torque through the automatic transmission is switched is reliably reduced.

Further, the ECU 40 sets the abating coefficient to zero when the throttle opening degree TApos reaches the second throttle opening degree tA2, so that the throttle opening degree TApos is not changed. Therefore, the speed of change of the engine speed NE when the order of the values of the engine speed NE and the converter speed NT is switched is reversed, and torque shock produced when the direction of torque through the automatic transmission is reversed is reliably reduced.

A second embodiment will now be described with reference to FIGS. 7 and 8. The differences from the first embodiment will be mainly discussed.

In this embodiment, to prevent undesirably slow acceleration of the vehicle due to a delayed abating control of the throttle opening degree, a period during which the throttle opening degree is maintained at a certain value is terminated within a time limit TL1. That is, if a period in which the throttle opening degree TApos is maintained at the second throttle opening degree tA2 surpasses the time limit TL1 during the abating control, the control for maintaining the throttle opening degree TApos to the second throttle opening degree TA2 is terminated even if the speed difference between the engine speed NE and the converter speed NT is less than the predetermined value n0.

Figure 7:
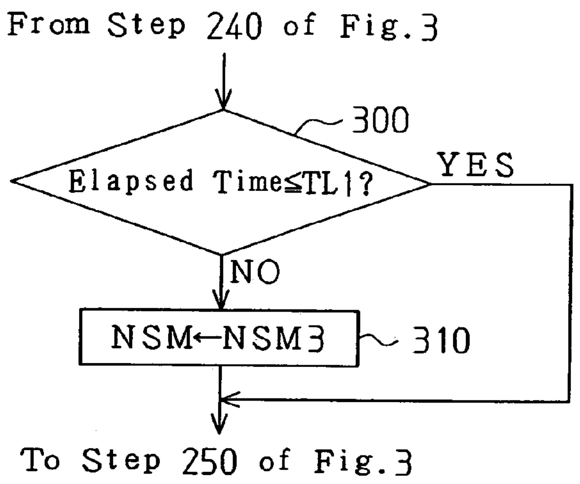
FIG. 7 is a flowchart showing a process for setting an abating control restricting period according to a second embodiment.

Such a control is made possible by performing a process shown in FIG. 7 between step 240 and step 250 of the target throttle opening degree computation process shown in FIG. 3.

After setting the abating coefficient NSM to zero in step 240, the ECU 40 proceeds to step 300. In step 300, the ECU 40 determines whether time that has elapsed since the abating coefficient NSM was set to zero in this abating control is within the time limit TL1. In a normal state, the time limit TL1 is sufficiently long to allow the engine speed NE to surpass the converter speed NT, and the speed difference (NE−NT) to reach and surpass the predetermined value n0.

If the elapsed time is within the time limit TL1, or if the outcome of step 300 is positive, the ECU 40 proceeds to step 250. In this case, the abating coefficient NSM, which is set to zero in step 240, is used for computing the target opening degree TAMOD in step 250 of FIG. 3.

If the elapsed time has surpassed the time limit TL1, or if the outcome of step 300 is negative, the abating coefficient NSM is set to NSM3 in step 310. In step 250 of FIG. 3, the abating coefficient NSM, which is set to NSM3, is used for computing the target opening degree TAMOD.

Figure 8:
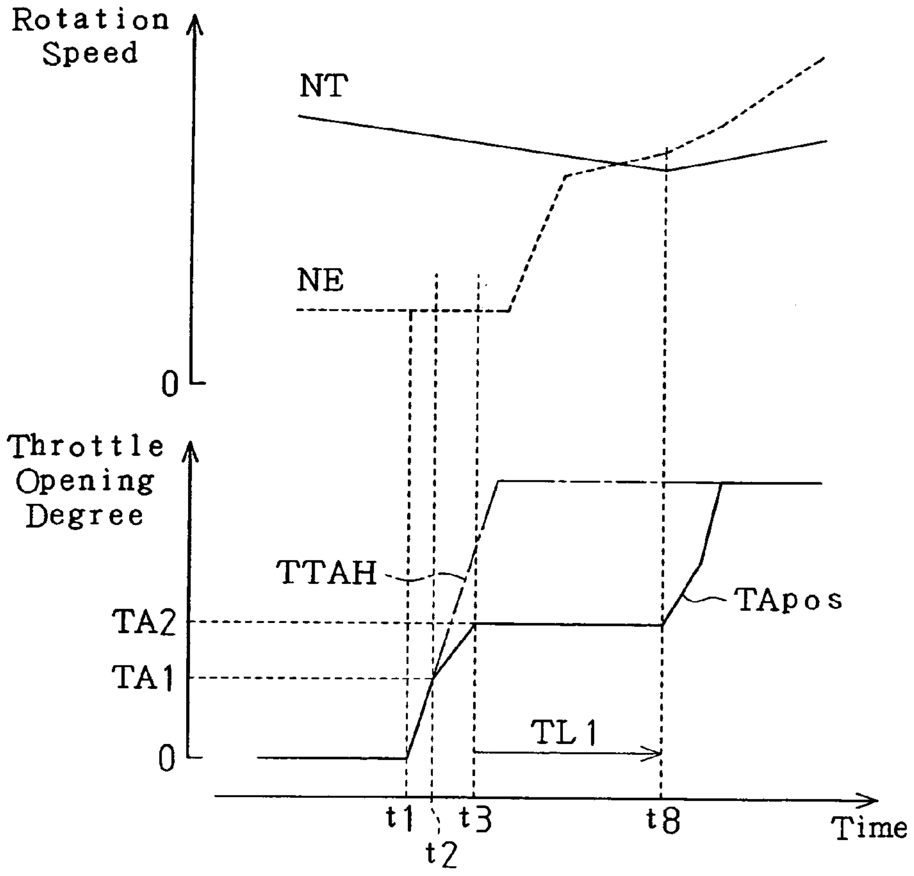
FIG. 8 is a timing chart showing an operation of the second embodiment.

FIG. 8 shows an example of control according to this embodiment. In this example, the abating control is started at time t1. When the throttle opening degree TApos reaches the second throttle opening degree TA2 at time t3, the abating coefficient NSM is set to zero. Thereafter, the throttle opening degree TApos is maintained at the second throttle opening degree TA2.

FIG. 8 illustrates a situation where an increase of the engine speed NE is delayed for some reason when the throttle opening degree is set to the second throttle opening degree TA2. In this situation, the period for the engine speed NE to surpass the converter speed NT and for the speed difference to reach the predetermined value n0 is extended.

However, in this embodiment, at time t8, or when the time limit TL1 has elapsed from time t3, the abating coefficient NSM is forcibly changed to NSM3 despite the fact that the speed difference between the engine speed NE and the converter speed NT is less than the predetermined value n0 . This quickly increases the throttle opening degree TApos thereafter. Accordingly, the speed of increase of the engine speed NE increases. Therefore, the current abating control is quickly terminated, and the throttle opening degree TApos is quickly increased to a level that corresponds to the pedal depression degree ACCP.

Accordingly, undesirably slow acceleration of the vehicle due to a delayed abating control is reliably prevented.

A third embodiment will now be described with reference to FIGS. 9 and 10. The differences from the first embodiment will be mainly discussed.

As in the second embodiment, to prevent undesirably slow acceleration of the vehicle due to a delayed abating control, a time limit TL2 is set in the control for maintaining the throttle opening degree TApos to the second throttle opening degree TA2. The time limit TL2 is set in consideration of acceleration demand of the driver. That is, in this embodiment, only when there is a greater demand for acceleration, or only when the acceleration pedal 38 is depressed by a relatively great degree, the time limit TL2, which is shorter than the time limit TL1, is set. If a period in which the throttle opening degree TApos is maintained at the second throttle opening degree TA2 surpasses the time limit TL2 during the abating control, the control for maintaining the throttle opening degree TApos to the second throttle opening degree TA2 is terminated even if the speed difference between the engine speed NE and the converter speed NT is less than the predetermined value n0.

Figure 9:
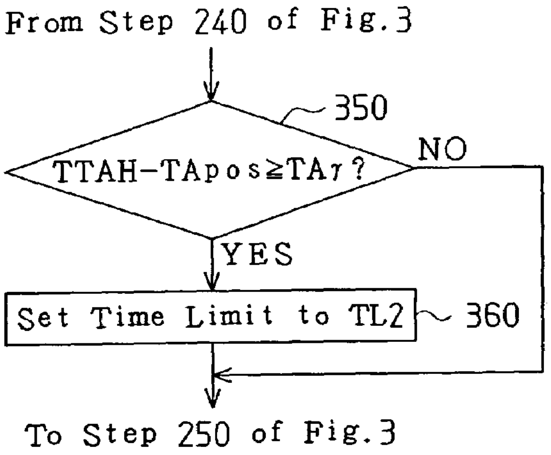
FIG. 9 is a flowchart showing a process for setting an abating control restricting period according to a third embodiment.

Such a control is made possible by performing a process shown in FIG. 9 between step 240 and step 250 of the target throttle opening degree computation process shown in FIG. 3, and by performing a process similar to the process shown in FIG. 7.

After setting the abating coefficient NSM to zero in step 240, the ECU, in step 350, determines whether the difference between the provisional target opening degree TTAH, which is computed based on the pedal depression degree ACCP, and the throttle opening degree TApos, or the difference (TTAH−TApos), is equal to or more than a predetermined value TAγ. In other words, the ECU 40 determines whether the difference between the provisional target opening degree TTAH and the second throttle opening degree TA2 is equal to or more than the predetermined value TAγ.

If the difference (TTAH−TApos) is less than the predetermined value TAγ, or the outcome of step 350 is negative, the ECU 40 proceeds to step 250. In this case, the abating coefficient NSM, which is set to zero in step 240, is used for computing the target opening degree TAMOD in step 250 of FIG. 3.

If the difference (TTAH−TApos) is equal to or more than the predetermined value TAγ, or the outcome of step 350 is positive, the ECU 40 sets the time limit TL2 in step 360. The time limit TL2 is set to be shorter than the time limit TL1.

Subsequent to step 360, the ECU 40 proceeds to step 250, which is described above. Although not illustrated in the flowcharts, the ECU 40 performs a similar process as shown in FIG. 7. That is, from when the time limit TL2 is set, the ECU 40 determines whether a period in which the throttle opening degree TApos is maintained at the second throttle opening degree TA2 is within the time limit TL2 after step 240. If the period is within the time limit TL2, the ECU 40 proceeds to step 250. In this case, the abating coefficient NSM, which is set to zero, is used for computing the target opening degree TAMOD. However, if the period is more than the time limit TL2, the abating coefficient NSM is set to NSM3. In the subsequent step 250, the abating coefficient, which is set to NSM3, is used for computing the target opening degree TAMOD.

Figure 10:
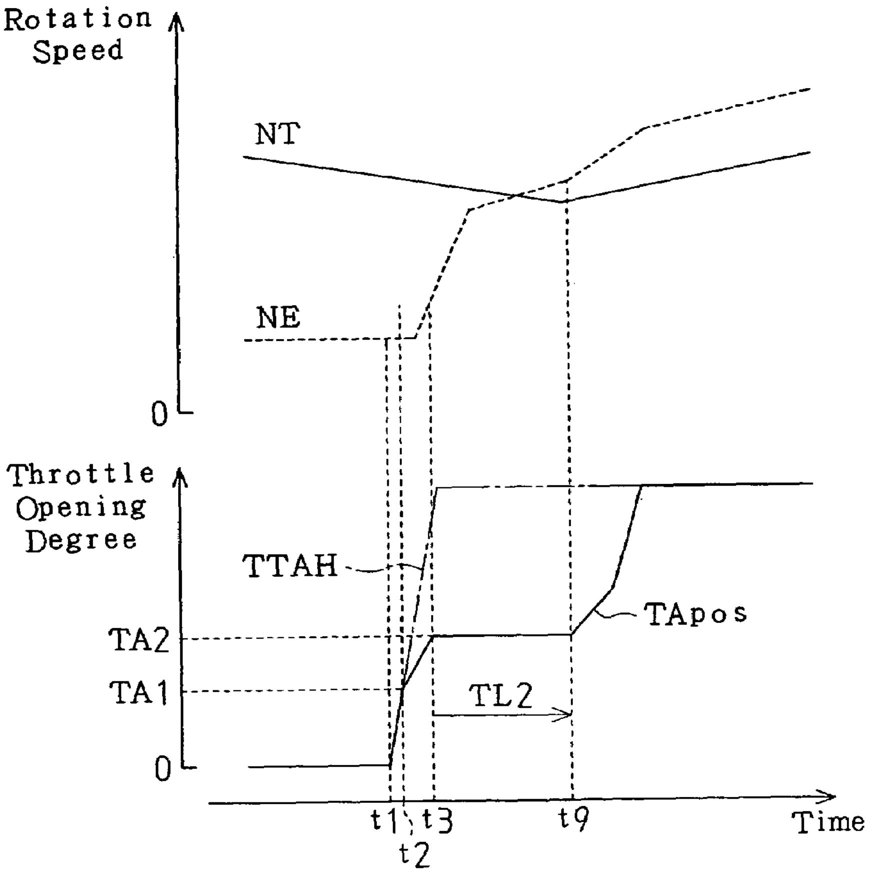
FIG. 10 is a timing chart showing an operation of the third embodiment.

FIG. 10 shows an example of control according to this embodiment. In this example, the abating control is started at time t1. When the throttle opening degree TApos reaches the second throttle opening degree TA2 at time t3, the abating coefficient NSM is set to zero. Thereafter, the throttle opening degree TApos is maintained at the second throttle opening degree TA2.

When the difference between the provisional target opening degree TTAH and the throttle opening degree TApos is equal to or more than TAγ, the time limit TL2 is set from time t3. At time t9, or when the time limit TL2 has elapsed from time t8, the abating coefficient NSM is forcibly changed to NSM3 regardless of the degree of the speed difference between the engine speed NE and the converter speed NT. This quickly increases the throttle opening degree TApos thereafter. Accordingly, the speed of increase of the engine speed NE increases. Therefore, the current abating control is quickly terminated, and the throttle opening degree TApos is quickly increased to a level that corresponds to the pedal depression degree ACCP.

Accordingly, undesirably slow acceleration of the vehicle due to a delayed abating control is reliably prevented.

A fourth embodiment will now be described with reference to FIGS. 11 and 12. The differences from the first embodiment will be mainly discussed.

In this embodiment, to prevent undesirably slow acceleration of the vehicle due to a delayed abating control, the abating control is controlled to be terminated within a time limit TL3 when measured from a point during the abating control. That is, in this embodiment, when time elapsed after the speed difference between the engine speed NE and the converter speed NT reaches and surpasses a predetermined value n2 ($0<n2<n0$ ) exceeds the time limit TL3, the abating control is inhibited and forcibly terminated. In other words, when time elapsed since the engine speed NE becomes greater than the converter speed NT by the predetermined value n2 surpasses the time limit TL3, the abating control is stopped.

Figure 11:
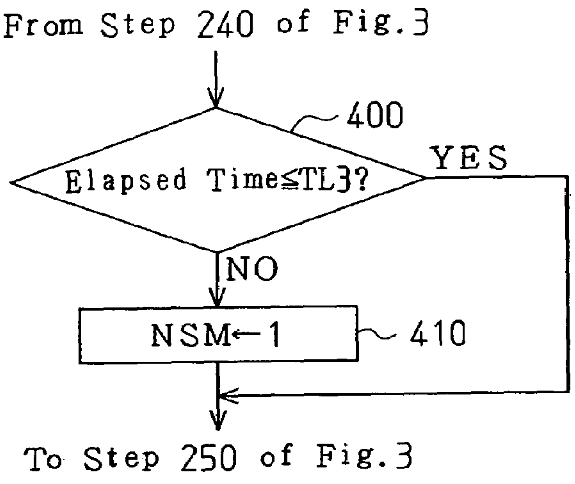
FIG. 11 is a flowchart showing a process for setting an abating control restricting period according to a fourth embodiment.

Such a control is made possible by performing a process shown in FIG. 11 between step 240 and step 250 of the target throttle opening degree computation process shown in FIG. 3.

After setting the abating coefficient NSM to zero in step 240, the ECU 40 proceeds to step 400. In step 400, the ECU 40 determines whether time elapsed since the speed difference between the engine speed NE and the converter speed NT reaches the predetermined value n2 is within the time limit TL3. In a normal state, the time limit TL3 is sufficiently long to allow the engine speed NE to surpass the converter speed NT, and the speed difference (NE−NT) to reach and surpass the predetermined value n0.

If the elapsed time is within the time limit TL3, or if the outcome of step 400 is positive, the ECU 40 proceeds to step 250. In this case, the abating coefficient NSM, which is set to zero in step 240, is used for computing the target opening degree TAMOD in step 250 of FIG. 3.

If the elapsed time has surpassed the time limit TL3, or if the outcome of step 400 is negative, the abating coefficient NSM is set to one. In step 250 of FIG. 3, the abating coefficient NSM, which is set to one, is used for computing the target opening degree TAMOD.

In this embodiment, steps 225 and 235 of FIG. 3 become unnecessary.

Figure 12:
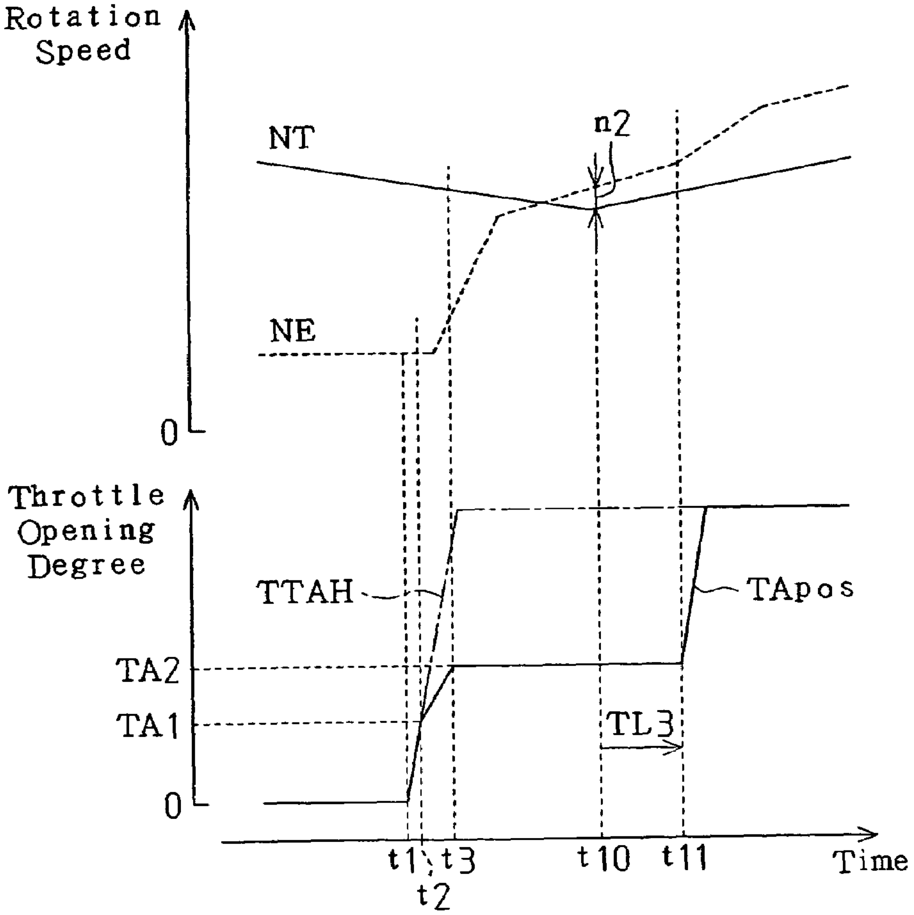
FIG. 12 is a timing chart showing an operation of the fourth embodiment.

FIG. 12 shows an example of control according to this embodiment. In this example, the abating control is started at time t1. When the throttle opening degree TApos reaches the second throttle opening degree TA2 at time t3, the abating coefficient NSM is set to zero. Thereafter, the throttle opening degree TApos is maintained at the second throttle opening degree TA2.

FIG. 12 illustrates a situation where an increase of the engine speed NE is delayed for some reason while the throttle opening degree is set to the second throttle opening degree TA2. In this situation, the period for the engine speed NE to surpass the converter speed NT and for the speed difference to reach the predetermined value n0 is extended.

In this embodiment, the time limit TL3 is set from time t10, at which the speed difference (NE−NT) between the current engine speed NE and the current converter speed NT reaches and surpasses the predetermined value n2. At time t11, or when the time limit TL3 elapses from time t10, the abating coefficient NSM is set to one. Thus, the current provisional target opening degree TTAH is set as the target opening degree TAMOD without being changed, and the throttle opening degree TApos is quickly increased to a level that corresponds to the pedal depression degree ACCP. Accordingly, the speed of increase of the engine speed NE increases.

Accordingly, undesirably slow acceleration of the vehicle due to a delayed abating control is reliably prevented.

A fifth embodiment will now be described with reference to FIGS. 13 and 14. The differences from the first embodiment will be mainly discussed.

In this embodiment, to prevent undesirably slow acceleration of the vehicle due to a delayed abating control, a period from when the throttle opening degree TApos reaches the second throttle opening degree TA2 to when the abating control is terminated is controlled to be within a time limit TL4. That is, in this embodiment, if a period from when the throttle opening degree TApos reaches the second throttle opening degree TA2 surpasses the time limit TL4, the abating control is forcibly terminated even if the speed difference between the engine speed NE and the converter speed NT is less than the predetermined value n0.

Figure 13:
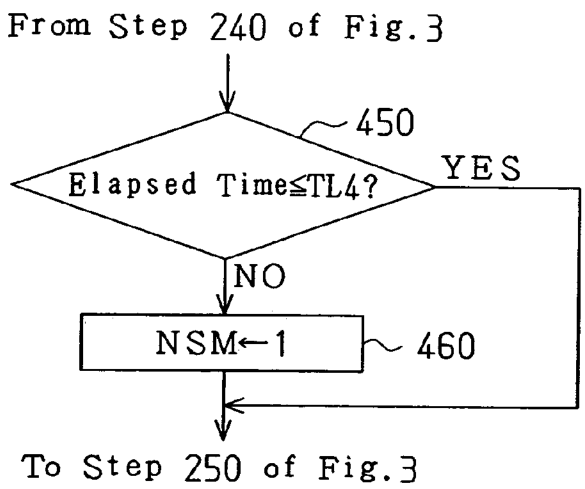
FIG. 13 is a flowchart showing a process for setting an abating control restricting period according to a fifth embodiment.

Such a control is made possible by performing a process shown in FIG. 13 between step 240 and step 250 of the target throttle opening degree computation process shown in FIG. 3.

After setting the abating coefficient NSM to zero in step 240, the ECU 40 proceeds to step 450. In step 450, the ECU 40 determines whether time that has elapsed since the abating coefficient NSM was set to zero in this abating control is within the time limit TL4. In a normal state, the time limit TL4 is sufficiently long to allow the engine speed NE to surpass the converter speed NT, and the speed difference (NE−NT) to reach and surpass the predetermined value n0 . Also, the time limit TL4 is set such that the continuation of the abating control does not cause the driver to be disturbed by a slow acceleration of the vehicle.

If the elapsed time is within the time limit TL4, or if the outcome of step 450 is positive, the ECU 40 proceeds to step 250. In this case, the abating coefficient NSM, which is set to zero in step 240, is used for computing the target opening degree TAMOD in step 250 of FIG. 3.

If the elapsed time has surpassed the time limit T4, or if the outcome of step 450 is negative, the abating coefficient NSM is set to one in step 460. In step 250 of FIG. 3, the abating coefficient NSM, which is set to one, is used for computing the target opening degree TAMOD.

Figure 14:
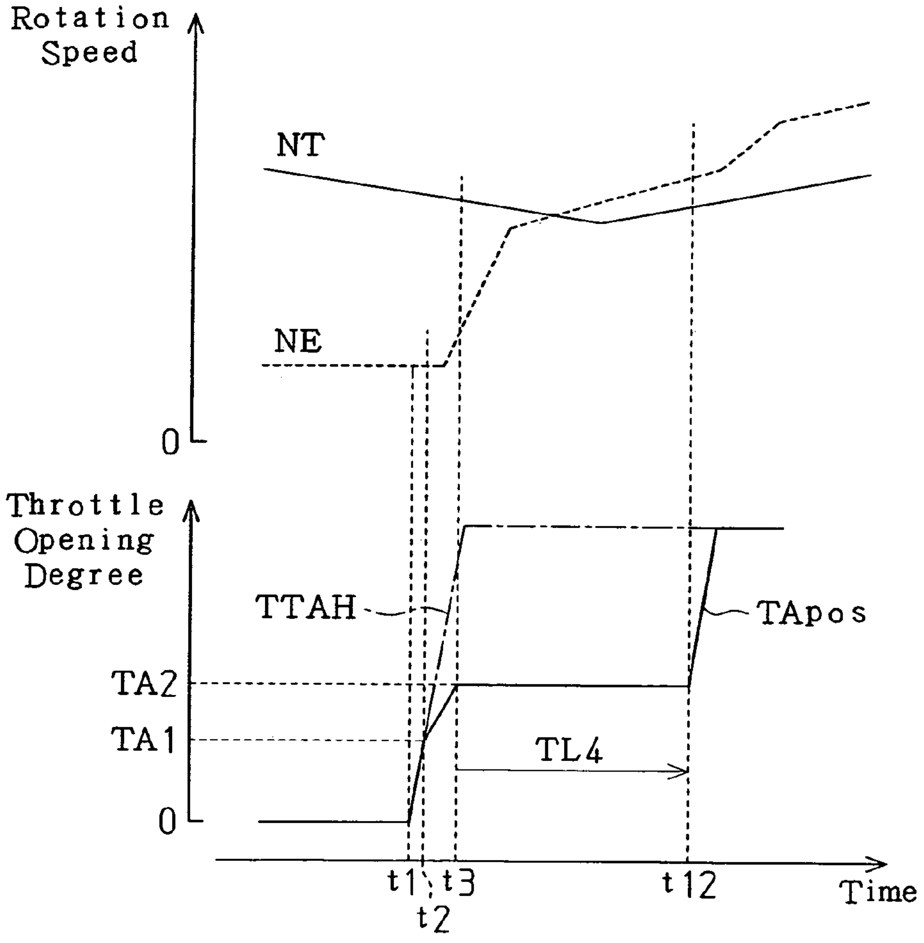
FIG. 14 is a timing chart showing an operation of the fifth embodiment.

FIG. 14 shows an example of control according to this embodiment. In this example, the abating control is started at time t1. When the target opening degree TAMOD reaches the second throttle opening degree TA2 at time t3, the abating coefficient NSM is set to zero. Thereafter, the throttle opening degree is maintained at the second throttle opening degree TA2.

FIG. 14 illustrates a situation where an increase of the engine speed NE is delayed for some reason while the throttle opening degree is set to the second throttle opening degree TA2. In this situation, the period for the engine speed NE to surpass the converter speed NT and for the speed difference to reach the predetermined value n0 is extended.

However, in this embodiment, at time t12, or when the time limit TL4 has elapsed from time t3, the abating coefficient NSM is forcibly changed to one despite the fact that the speed difference between the engine speed NE and the converter speed NT is less than the predetermined value n0 . Thus, the current provisional target opening degree TTAH is set as the target opening degree TAMOD without being changed, and the throttle opening degree TApos is quickly increased to a level that corresponds to the pedal depression degree ACCP. Accordingly, the speed of increase of the engine speed NE increases.

Thus, undesirably slow acceleration of the vehicle due to a delayed abating control is reliably prevented.

A sixth embodiment will now be described with reference to FIG. 15. The differences from the first embodiment will be mainly discussed.

During the abating control, even if the speed difference between the engine speed NE and the converter NT is less than the predetermined value n0 , it can be assumed that the vehicle is in a full acceleration if the throttle opening degree has been sufficiently increased. In this state, it is useless to execute the abating control. Accordingly, in this embodiment, if the throttle opening degree TApos reaches a predetermined value TAc during the abating control, the abating control is instantly inhibited and forcibly terminated.

Figure 15:
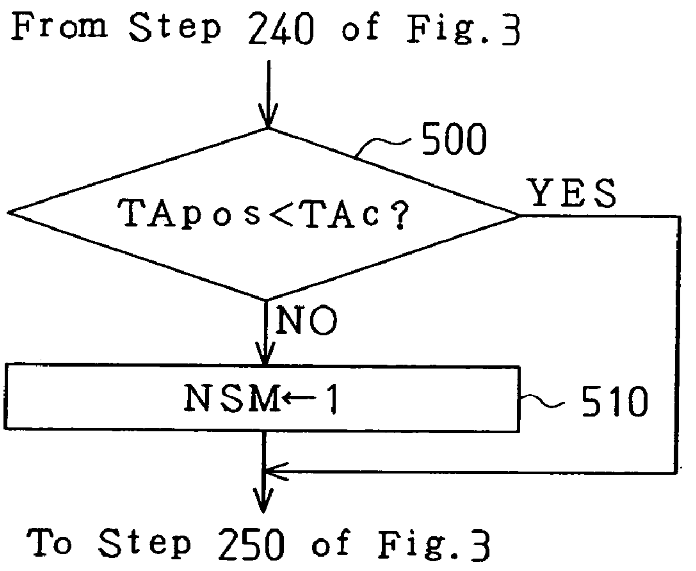
FIG. 15 is a flowchart showing a process for setting an abating control restricting period according to a sixth embodiment.

Such a control is made possible by performing a process shown in FIG. 15 between step 240 and step 250 of the target throttle opening degree computation process shown in FIG. 3.

After setting the abating coefficient NSM to zero in step 240, the ECU 40 determines whether the current throttle opening degree TApos is less than the predetermined value TAc in step 500. The predetermined value TAc represents a throttle opening degree that is sufficiently great to permit an assumption that the vehicle is in an acceleration. The predetermined value TAc is for example 30°.

If the current throttle opening degree TApos is less than the predetermined value TAc, or the outcome of step 500 is positive, the ECU 40 proceeds to step 250. In this case, the abating coefficient NSM, which is set to zero in step 240, is used for computing the target opening degree TAMOD in step 250 of FIG. 3.

If the current throttle opening degree TApos is equal to or more than the predetermined value TAc, or if the outcome of step 500 is negative, the abating coefficient NSM is set to one in step 510. In step 250 of FIG. 3, the abating coefficient NSM, which is set to one, is used for computing the target opening degree TAMOD. That is, in this case, the current abating control is inhibited and forcibly terminated.

In this manner, if it is confirmed that acceleration of the vehicle is started during the abating control, and if the continuation of the abating control is determined to be unnecessary, the current abating control is inhibited and forcibly terminated. Therefore, according to this embodiment, the abating control is prevented from being unnecessarily continued. This improves the drivability and the acceleration property at the same time.

A seventh embodiment will now be described with reference to FIG. 16. The differences from the first embodiment will be mainly discussed.

During the abating control, due to an increase of the intake air amount caused by an increase of the throttle opening degree or due to a shifting to a higher gear causes the engine speed NE to increase or the converter speed NT to decrease. In this case, the engine speed NE can become sufficiently higher than the converter speed NT before the completion of the abating control. In this state, acceleration of the vehicle has already been started, and it is useless to execute the abating control.

In this embodiment, during the abating control, changes of the engine speed NE and the converter speed NT are monitored. When the engine speed NE is greater than the converter speed NT by a predetermined value n3, the abating control is discontinued.

Figure 16:
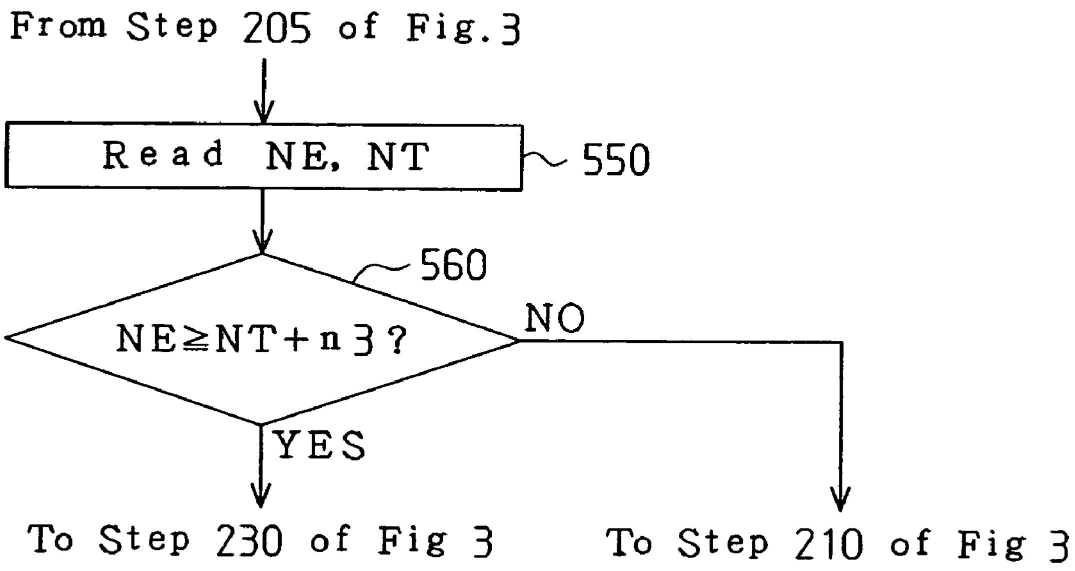
FIG. 16 is a flowchart showing a process for setting an abating control restricting period according to a seventh embodiment.

Such a control is made possible by performing a process shown in FIG. 16 between step 205 and step 210 of the target throttle opening degree computation process shown in FIG. 3.

After computing the provisional target opening degree TTAH in step 205, the ECU 40 proceeds to step 550 shown in FIG. 16. In step 550, the ECU 40 reads the current engine speed NE and the current converter speed NT. In step 560, the ECU 40 determines whether the engine speed NE is greater than the converter speed NT by an amount equal to or greater than the predetermined value n3. If the outcome of step 560 is negative, the ECU 40 proceeds to step 210 of FIG. 3.

If the engine speed NE is greater than the converter speed NT by an amount equal to or greater than the predetermined value n3, or if the outcome of step 560 is positive, the ECU 40 proceeds to step 230 of FIG. 3. In step 230, the ECU sets the abating coefficient NSM to one. That is, if the acceleration of the vehicle has already been started and the abating control is unnecessary, the current abating control is forcibly terminated.

Therefore, according to the control of this embodiment, the abating control is prevented from being unnecessarily continued. This improves the drivability and the acceleration property at the same time.

A throttle opening degree control apparatus for an internal combustion engine according to an eighth embodiment of the present invention will now be described with reference to FIGS. 17(*a*) to 18. The control apparatus is used for a gasoline engine 11 in this embodiment. The differences from the first embodiment will be mainly discussed.

In the first embodiment, the first throttle opening degree TA1 and the second throttle opening degree TA1 are computed by referring to the abating coefficient changing point maps M1, M2. The first and second throttle opening degrees TA1, TA2 represent timing at which the abating coefficient is switched. To the contrast, in this embodiment, the first and second throttle opening degrees TA1, TA2 are independently set according to the gear of the automatic transmission 44 that is selected during the throttle opening control degree control. This embodiment has the following two objectives.

Demands for a throttle opening degree control vary depending on what gear is currently selected. The first objective of this embodiment is to satisfy such demands in the throttle opening degree control. For example, when the first gear is selected, a priority is assigned to the acceleration. When the second gear is selected, a priority is assigned to acceleration and reduction of shock due to acceleration. When the third gear is selected, priority is assigned to reduction of shock due to acceleration.

A second objective is to perform an accurate control in consideration of the fact that the throttle opening degree at which the engine speed NE is a predetermined value is changed according to the selected gear. That is, when the converter speed NT is higher than the engine speed NE, the torque converter 41 increases the engine speed NE. At this time, the degree of the increase of the engine speed NE varies depending on the selected gear of the automatic transmission 44. Accordingly, the throttle opening degree at which the engine speed NE is a predetermined value varies depending on the selected gear. Therefore, to perform an accurate control, such variations of the throttle opening degree must be taken into consideration.

FIGS. 17(*a*) to 17(*c*) show maps of abating coefficient changing points for setting the first and second throttle opening degrees TA1 and TA2. FIG. 17(*a*) is a map showing abating coefficient changing points for setting first and second throttle opening degrees TA11 and TA12 for a first gear. FIG. 17(*b*) is a map showing abating coefficient changing points for setting first and second throttle opening degrees TA21 and TA22 for a second gear. FIG. 17(*c*) is a map showing abating coefficient changing points for setting first and second throttle opening degrees TA11 and TA12 for a third gear.

FIGS. 17(*a*) to 17(*c*) show abating coefficient changing point maps for the first, second, and third gears. For fourth and fifth gears, appropriate maps of abating coefficient changing points may be set. When setting the maps, the above described two objectives are preferably taken into consideration. However, only one of the two objectives may be taken into consideration.

Figure 18:
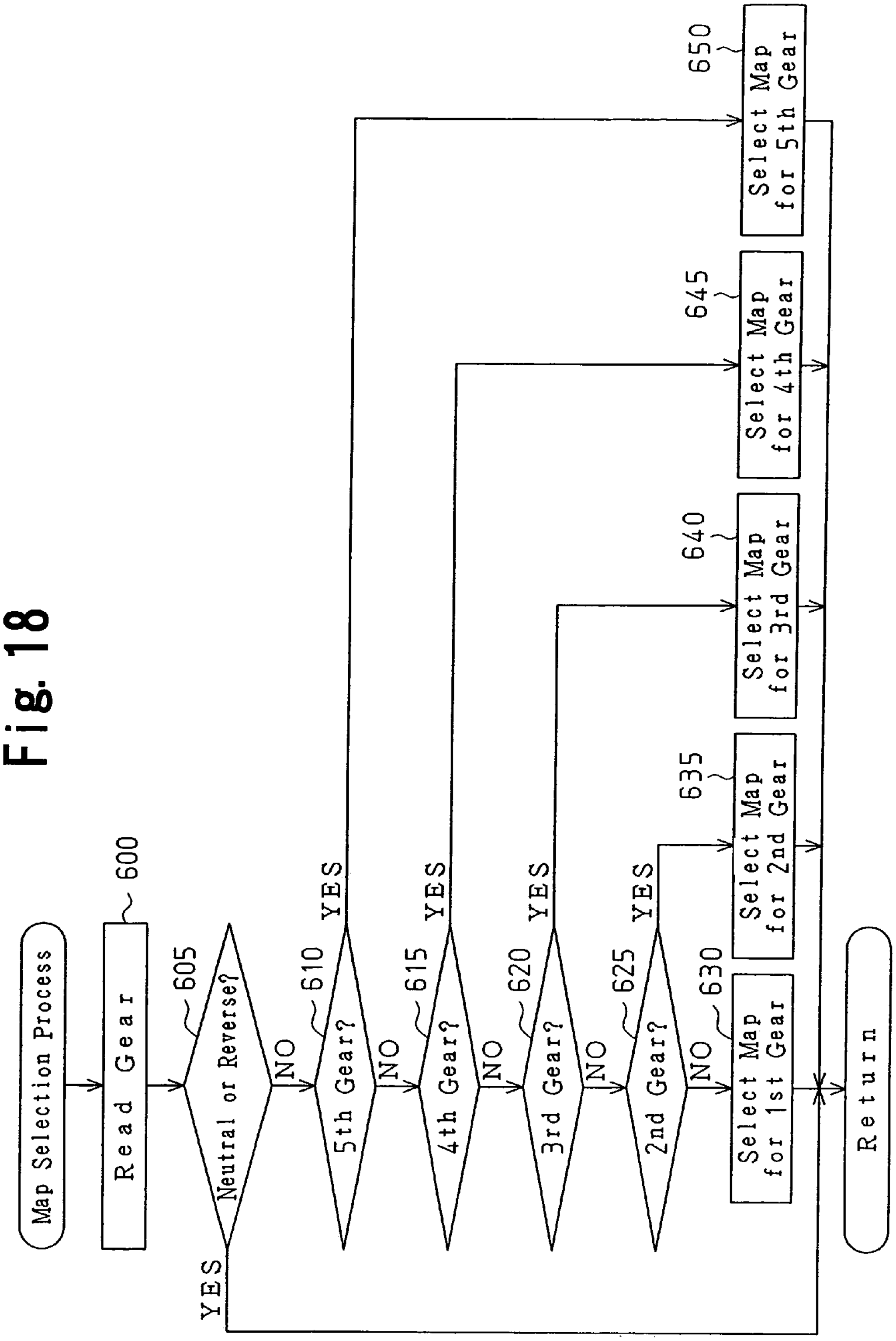
FIG. 18 is a flowchart showing a process for selecting a map of abating coefficient changing points according to the eighth embodiment.

Selection of the abating coefficient changing point map is performed according to a procedure shown in FIG. 18. FIG.

18 is a flowchart showing the procedure. This routine is repeatedly executed by the ECU 40 at predetermined intervals.

In step 600, the ECU 40 reads a detected value of the gear sensor 45. Next, in step 605, the ECU 40 determines whether the automatic transmission 44 is in the neutral or the reverse based on the detected value read in step 600. If the transmission 44 is in the neutral or the reverse, the ECU 40 temporarily suspends the current procedure. This is because the throttle opening degree control based on the abating coefficient changing point map is not executed when the gear is in the neutral or the reverse.

Next, in steps 610 to 625, the ECU 40 determines which one of the first to fifth gears the automatic transmission 44 is in based on the detected values read in step 600. According to the determination, the ECU 40 selects the abating coefficient changing point map in one of steps 630 to 650. Thereafter, the ECU 40 temporarily suspends the current routine. Selection of the abating coefficient changing point map in steps 630 to 650 can be performed by storing the address of a map in the ECU 40 in the RAM. Accordingly, an appropriate map is retrieved according to the stored addresses in steps 120 and 140, and, using the retrieved maps, the first throttle opening degree TA1 and the second throttle opening degree TA2 are computed.

If the gear is changed during the procedure shown in FIG. 2, a new abating coefficient changing point map is selected according to the procedure shown in FIG. 18. However, in the procedure for controlling the throttle opening degree shown in FIG. 3, the selected abating coefficient changing point map is used without being changed.

In addition to the advantages of the first embodiment, this embodiment has the following advantages.

In this embodiment, the first and second throttle opening degrees TA1, TA2 are independently set according to the current gear of the automatic transmission 44 during the throttle opening control degree control. Therefore, demands regarding the throttle opening degree control for each gear are satisfied. That is, although demands for the throttle opening degree control are different for each gear, the different demands are satisfied. Further, the accuracy of the control is improved in consideration of the fact that the throttle opening degree at which the engine speed NE is a predetermined value varies according to the selected gear.

A throttle opening degree control apparatus for an internal combustion engine according to a ninth embodiment of the present invention will now be described with reference to FIG. 19. The control apparatus is used for a gasoline engine 11 in this embodiment. The differences from the fifth embodiment shown in FIGS. 13 and 14 will be mainly discussed.

In the fifth embodiment, the time limit TL4 is set as shown in FIG. 13 for the period from when the abating coefficient NSM is set to zero to when the abating control is terminated. To the contrast, the time limit is set for each gear in this embodiment. The objective is to satisfy demands in a throttle opening degree control related to each gear position. For example, a priority is assigned in the following manner when setting the time limit. That is, when the first gear is selected, a priority is assigned to the acceleration. When the second gear is selected, a priority is assigned to acceleration and a control for reducing shock due to acceleration. When the third gear is selected, priority is assigned to the control for reducing shock due to acceleration. In the higher gears, or the fourth gear and the fifth gear, priority is assigned to reduction of the acceleration shock when setting the time limit.

Figures 19, 20:
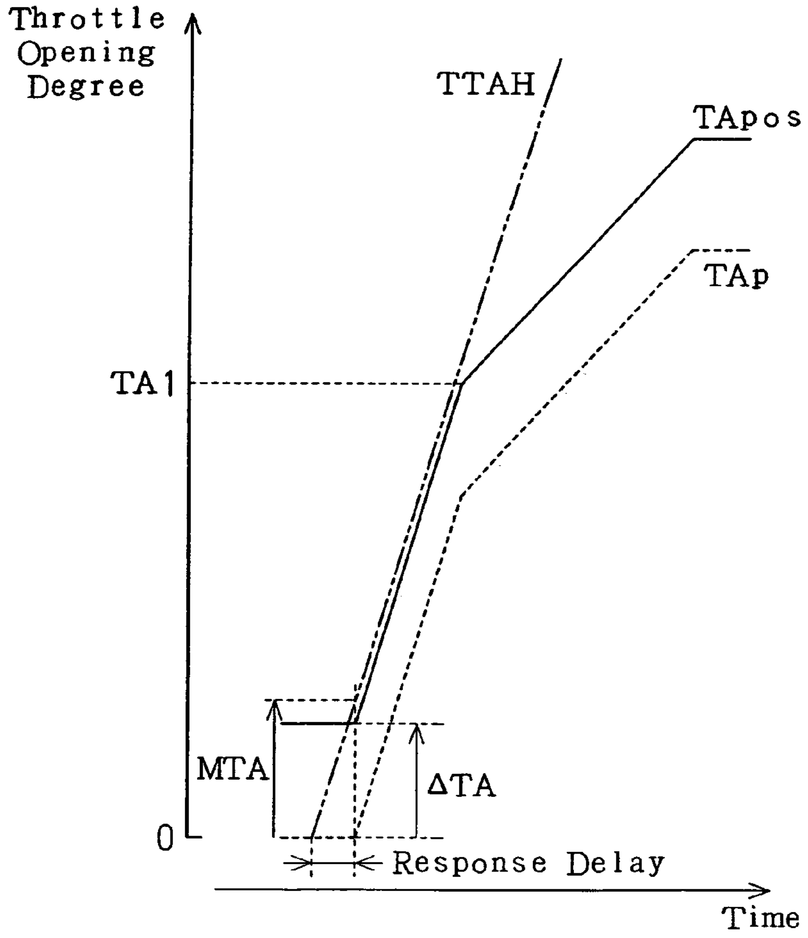
FIG. 19 is a map showing abating restricting periods corresponding to the gears according to a ninth embodiment.
FIG. 20 is a timing chart showing an operation of a tenth embodiment.

FIG. 19 shows an example of a map defining the relationship between the gears and the time limit.

The procedure for setting time limits corresponding to the gears is performed according to the flowchart shown in FIG. 18. In steps 610 to 625, the ECU 40 determines which one of the first to fifth gears of the automatic transmission 44 is currently selected. According to the determination, the ECU 40 selects a time limit map in one of steps 630 to 650, and sets a time limit that corresponds to the current gear. Thereafter, the ECU 40 temporarily suspends the current routine. Selection of the time limit corresponding to the gear can be performed by memorizing an address at which the corresponding one of the stored addresses shown in FIG. 19 in the RAM. Accordingly, in step 450 of FIG. 13, an appropriate time limit is retrieved according to the memorized address and is used.

If the gear is changed during the procedure shown in FIG. 13, a new time limit is selected according to the procedure shown in FIG. 18. However, in the procedure for controlling the throttle opening degree shown in FIG. 13, the selected time limit is used without being changed.

In addition to the advantages of the fifth embodiment, this embodiment has the following advantages.

The time limit TL4, which is set for the period from when the abating coefficient NSM is set to zero to when the abating process is terminated, is set for each gear. Accordingly, demands in the throttle opening degree control, which demands vary according to each gear, are satisfied.

A throttle opening degree control apparatus for an internal combustion engine according to a tenth embodiment of the present invention will now be described with reference to FIG. 20. The control apparatus is used for a gasoline engine 11 in this embodiment. The differences from the first to ninth embodiments will be mainly discussed.

In each of the above embodiments, the abating coefficient NSM is changed when the throttle opening degree TApos reaches the first throttle opening degree TA1 and the second throttle opening degree TA2. The throttle opening degree TApos is computed by adding an offset value to a detected throttle opening degree TAp detected by the throttle sensor 37*a*. The offset value is used for compensating for a response delay of the detected throttle opening degree TAp. This procedure will be described with reference to FIG. 20.

In FIG. 20, the throttle opening degree TApos is set to a value computed by adding an offset value ΔTA to the detected throttle opening degree TAp. Then, based on whether the throttle opening degree TApos has reached the first throttle opening degree TA1 or the second throttle opening degree TA2, the abating coefficient NSM is changed such that a response delay of the detected throttle opening degree TAp is compensated for.

That is, as shown in FIG. 20, a slight response delay exists from when the provisional target opening degree TTAH, which is an opening degree command value, is set to when the throttle sensor 37*a* detects that the throttle valve 36 reaches the set provisional target opening degree TTAH. Therefore, the provisional target opening degree TAH at a point when the detected throttle opening degree TAp starts increasing from zero is greater than the detected throttle opening degree TAp by a predetermined offset value MTA. The offset value MTA corresponds to a changed amount of the provisional target opening degree TTAH during a response delay of the detected throttle opening degree TAp relative to the provisional target opening degree TTAH.

The offset value ΔTA is set equal to or less than the offset value MTA, or the provisional target opening degree TTAH during a response delay. Accordingly, the abating control of the throttle opening degree is started immediately after a point when the current throttle opening degree TAp detected by the throttle sensor 37*a* starts changing.

Normally, the abating control is executed under a condition that the throttle opening degree TApos, which is a value used for determining the changing points of the abating coefficient, is equal to or less than the provisional target opening degree TTAH. Thus, if a value computed by adding a value greater than the offset value MTA to the detected throttle opening degree TAp is used as the throttle opening degree TApos, the abating control cannot be executed.

In addition to the advantages of the preceding embodiments, this embodiment has the following advantages.

The throttle opening degree TApos, which is computed by adding the offset value ΔTA to the current throttle opening degree TAp detected by the throttle sensor 37*a*, is used for the abating control. Therefore, even if a response delay of the detected throttle opening degree TAp exists, the abating control is reliably executed while compensating for the response delay.

The offset value ΔTA is set equal to or less than the offset value MTA, which corresponds to a changed amount of the provisional target opening degree TTAH during a response delay of the detected throttle opening degree TAp relative to the provisional target opening degree TTAH. Accordingly, the abating control of the throttle opening degree is reliably started immediately after a point when the current throttle opening degree TAp detected by the throttle sensor 37*a* starts changing.

The above illustrated embodiments may be embodied as follows.

In the illustrated embodiments, the vehicle driving system includes the torque converter 41 and the automatic transmission 44. However, the vehicle driving system may include a clutch mechanism (coupling mechanism) that is engaged and disengaged by an actuator driven with electrical signals.

In the illustrated embodiments, the automatic transmission having a plurality of gears is used. However, the present invention may be embodied in a continuously variable transmission.

In the second and third embodiments, the time limits TL1 and TL2 are measured from time at which the abating coefficient NSM is set to zero. However, the time limits TL1 and TL2 may be measured, for example, from time at which the abating coefficient NSM is set to NSM1.

In the ninth embodiment, the time limit TL4, which is set for the period from when the abating coefficient NSM is set to zero to when the abating process is terminated, is set for each gear. This configuration may be changed. For example, the time limit (first and second embodiments), which is set for the period from when the abating coefficient NSM is set to zero to when the abating coefficient NSM is set to NSM3, may be varied according to the selected gear. In short, the configuration may be changed as long as a time limit that is provided for an appropriate period in the period for the abating process is changed according to the selected gear.

In the tenth embodiment, if the response delay of the throttle opening degree TAp relative to the provisional target opening degree TTAH changes due to secular deterioration, the offset value ΔTA to be added to the throttle opening degree TAp may be changed, accordingly.

The abating control of the throttle opening degree according to the present invention is designed for reducing the shock in the transmission due to a reverse in the torque transmission. Therefore, the abating control may be applied to a control of the throttle opening degree when the vehicle is shifted from acceleration to deceleration.

The present examples and embodiments are to be considered as illustrative and not restrictive and the invention is not to be limited to the details given herein, but may be modified within the scope and equivalence of the appended claims.

The invention claimed is:

1. An apparatus for controlling a throttle opening degree, which is an opening degree of a throttle valve of an internal combustion engine mounted on a vehicle, wherein the vehicle has a driving system coupled to an output shaft of the internal combustion engine, the apparatus comprising:

a controller, wherein the controller sets a target value of the throttle opening degree based on a depression degree of an acceleration pedal provided in the vehicle, wherein the controller gradually changes the throttle opening degree at a predetermined gradual change speed such that the throttle opening degree reaches the target value, and wherein a rotation speed of the output shaft changes in accordance with changes in the throttle opening degree, wherein the controller limits the gradual change speed of the throttle opening degree for a predetermined period such that a changing speed of the rotation speed of the output shaft is suppressed at a reverse time when a direction of torque transmitted between the driving system and the output shaft is reversed, wherein the driving system includes an input shaft and a coupling mechanism, wherein the coupling mechanism couples the input shaft to the output shaft while permitting the input shaft and the output shaft to rotate relative to each other, and wherein the controller recognizes a reverse of the direction of torque based on switching in the order of the values of the rotation speed of the output shaft and the rotation speed of the input shaft.

2. The apparatus according to claim 1, wherein, after the order of the values of the rotation speed of the output shaft and the rotation speed of the input shaft is switched and when the difference between the rotation speeds reaches and surpasses a predetermined value, the controller terminates a control for limiting the gradual change speed of the throttle opening degree.

3. The apparatus according to claim 1, wherein the controller sets a first throttle opening degree that corresponds to a rotation speed of the output shaft before the order of the values of the rotation speed of the output shaft and the rotation speed of the input shaft is switched and when the difference between the rotation speeds is decreased to a first predetermined value, and wherein, when the throttle opening degree reaches the first throttle opening degree, the controller starts a control for limiting the gradual change speed of the throttle opening degree.

4. The apparatus according to claim 3, wherein the controller sets a second throttle opening degree that corresponds to a rotation speed of the output shaft after the order of the values of the rotation speed of the output shaft and the rotation speed of the in put shaft is switched and when the difference between the rotation speeds is increased to a second predetermined value, and wherein, while the throttle opening degree is changing from the first throttle opening degree to the second throttle opening degree, the controller causes the gradual change speed of the throttle opening degree to be less than the changing speed of the target value.

5. The apparatus according to claim 4, wherein the controller sets the first and second throttle opening degrees according to the rotation speed of the input shaft.

6. The apparatus according to claim 5, wherein the driving system includes a transmission, and wherein the controller sets the first and second throttle opening degrees according to the gear of the transmission.

7. The apparatus according to claim 4, wherein, when the throttle opening degree reaches the second throttle opening degree, the controller starts a control for maintaining the throttle opening degree at the second throttle opening degree.

8. The apparatus according to claim 7, wherein, until the difference between the rotation speed of the output shaft and the rotation speed of the input shaft reaches a predetermined value, the controller maintains the throttle opening at the second throttle opening degree, and thereafter, the controller causes the throttle opening degree to reach the target value.

9. The apparatus according to claim 8, wherein the controller limits a period in which the throttle opening degree is maintained at the second throttle opening degree within a predetermined time limit.

10. The apparatus according to claim 9, wherein the controller sets the time limit according to the depression degree of the acceleration pedal.

11. The apparatus according to claim 9, wherein the driving system includes a transmission, and wherein the controller sets the time limit according to the gear of the transmission.

12. The apparatus according to claim 1, wherein, during the predetermined period, the controller decreases the gradual change speed of the throttle opening degree as time elapses.

13. The apparatus according to claim 12, wherein the controller decreases the gradual change speed of the throttle opening degree to zero as time elapses.

14. The apparatus according to claim 12, wherein, during the predetermined period, the controller first causes the gradual change speed of the throttle opening degree to be less than the changing speed of the target value, and then maintains the throttle opening degree at a fixed value that is different from the target value.

15. The apparatus according to claim 14, wherein the controller limits a period in which the throttle opening degree is maintained at the fixed value within a predetermined time limit.

16. The apparatus according to claim 15, wherein the controller sets the time limit according to the depression degree of the acceleration pedal.

17. The apparatus according to claim 15, wherein the driving system includes a transmission, and wherein the controller sets the time limit according to the gear of the transmission.

18. The apparatus according to claim 1, wherein the controller limits a period in which the gradual change speed of the throttle opening degree is limited within a period that corresponds to the depression degree of the acceleration pedal.

19. The apparatus according to claim 18, wherein the controller sets the period in which the gradual change speed of the throttle opening degree is limited to be shorter for a greater depression degree of the acceleration pedal.

20. The apparatus according to claim 1, wherein the driving system includes a transmission, and wherein the controller limits a period in which the gradual change speed of the throttle opening degree is limited within a period that corresponds to the gear of the transmission.

21. The apparatus according to claim 1, wherein, when the throttle opening degree reaches a predetermined value, the controller terminates a control for limiting the gradual change speed of the throttle opening degree.

22. The apparatus according to claim 1, further comprising a throttle sensor, wherein, to control the throttle valve, the controller uses a throttle opening degree that is computed by adding a predetermined offset value to an opening degree of the throttle valve detected by the throttle sensor, and wherein the offset value is set equal to or less than a change amount of the target value during a period of a response delay of the detected throttle opening degree relative to the target value.

23. An apparatus for controlling a throttle opening degree, which is an opening degree of a throttle valve of an internal combustion engine mounted on a vehicle, wherein the vehicle has a driving system coupled to an output shaft of the internal combustion engine, the apparatus comprising:

setting means that sets a target value of the throttle opening degree based on a depression degree of an acceleration pedal provided in the vehicle; and controlling means for controlling the throttle valve, wherein the controlling means gradually changes the throttle opening degree at a predetermined gradual change speed such that the throttle opening degree reaches the target value, and wherein a rotation speed of the output shaft changes in accordance with changes in the throttle opening degree, wherein the controlling means limits the gradual change speed of the throttle opening degree for a predetermined period such that a changing speed of the rotation speed of the output shaft is suppressed at a reverse time when a direction of torque transmitted between the driving system and the output shaft is reversed, wherein the driving system includes an input shaft and a coupling mechanism, wherein the coupling mechanism couples the input shaft to the output shaft while permitting the input shaft and the output shaft to rotate relative to each other, and wherein the controller recognizes a reverse of the direction of torque based on switching in the order of the values of the rotation speed of the output shaft and the rotation speed of the input shaft.

24. A method for controlling a throttle opening degree, which is an opening degree of a throttle valve of an internal combustion engine mounted on a vehicle, wherein the vehicle has a driving system coupled to an output shaft of the internal combustion engine, the method comprising:

setting a target value of the throttle opening degree based on a depression degree of an acceleration pedal provided in the vehicle;

gradually changing the throttle opening degree at a predetermined gradual change speed such that the throttle opening degree reaches the target value, wherein a rotation speed of the output shaft changes in accordance with changes in the throttle opening degree; and limiting the gradual change speed of the throttle opening degree for a predetermined period such that a changing speed of the rotation speed of the output shaft is suppressed at a reverse time when a direction of torque transmitted between the driving system and the output shaft is reversed;

wherein the driving system includes an input shaft and a coupling mechanism, wherein the coupling mechanism couples the input shaft to the output shaft while permitting the input shaft and the output shaft to rotate relative to each other, and wherein the controller recognizes a reverse of the direction of torque based on switching in the order of the values of the rotation speed of the output shaft and the rotation speed of the input shaft.

* * * * *